United States Patent
Dutta et al.

(10) Patent No.: US 11,956,805 B2
(45) Date of Patent: Apr. 9, 2024

(54) ASSISTED mmW SIDELINK BEAM DISCOVERY IN NON-STANDALONE MODE

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US); Junyi Li, Fairless Hills, PA (US); Shuanshuan Wu, San Diego, CA (US); Preeti Kumari, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/456,110

(22) Filed: Nov. 22, 2021

(65) Prior Publication Data
US 2023/0171755 A1    Jun. 1, 2023

(51) Int. Cl.
*H04W 4/40* (2018.01)
*H04W 8/00* (2009.01)
(Continued)

(52) U.S. Cl.
CPC .......... *H04W 72/40* (2023.01); *H04W 4/40* (2018.02); *H04W 8/005* (2013.01); *H04W 24/10* (2013.01); *H04W 28/0252* (2013.01); *H04W 40/24* (2013.01); *H04W 72/046* (2013.01); *H04W 72/25* (2023.01); *H04W 72/543* (2023.01); *H04W 76/14* (2018.02);
(Continued)

(58) Field of Classification Search
CPC ..... H04B 7/02–17; H04B 17/0082–409; H04J 11/0023–0093; H04J 2011/0003–0096; H04L 5/0001–0098; H04L 67/12–125; H04L 69/18–28; H04W 4/30–80; H04W 8/005–245; H04W 24/02–10; H04W 28/02–26; H04W 36/0005–385; H04W 40/005–38; H04W 48/02–20; H04W 64/003–006; H04W 72/02–569; H04W 74/002–0891; H04W 76/10–50; H04W 84/005–22; H04W 88/005–188; H04W 92/02–24
See application file for complete search history.

(56) References Cited

U.S. PATENT DOCUMENTS

2020/0322774 A1* 10/2020 Vargas .................. H04W 72/40
2020/0323019 A1* 10/2020 Vargas .................. H04W 72/40
(Continued)

*Primary Examiner* — Timothy J Weidner
(74) *Attorney, Agent, or Firm* — Procopio, Cory, Hargreaves & Savitch LLP/QUALCOMM

(57) ABSTRACT

This disclosure provides systems, devices, apparatus, and methods, including computer programs encoded on storage media, for assisted mmW sidelink beam discovery in non-standalone mode. A UE may transmit, to an AN, a request to access one or more ADs. The request may be based on an absence of at least one BPL that has a threshold QoS for a DRB with a second UE. The UE may receive, from the AN based on the transmitted request, an authorization to access the one or more ADs, and exchange, via an SRB, beam training information with the second UE based on the authorization to access the one or more ADs for performing a beam training procedure via the one or more ADs.

30 Claims, 16 Drawing Sheets

(51) Int. Cl.
*H04W 24/10* (2009.01)
*H04W 28/02* (2009.01)
*H04W 40/24* (2009.01)
*H04W 72/044* (2023.01)
*H04W 72/25* (2023.01)
*H04W 72/40* (2023.01)
*H04W 72/543* (2023.01)
*H04W 76/14* (2018.01)
*H04W 84/00* (2009.01)
*H04W 84/02* (2009.01)
*H04W 88/02* (2009.01)
*H04W 88/08* (2009.01)
*H04W 92/02* (2009.01)
*H04W 92/10* (2009.01)
*H04W 92/18* (2009.01)

(52) U.S. Cl.
CPC .......... *H04W 84/005* (2013.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(56) References Cited

U.S. PATENT DOCUMENTS

2023/0122731 A1* 4/2023 Dutta .................... H04W 72/40
2023/0144085 A1* 5/2023 Dutta .................... H04W 72/40

* cited by examiner

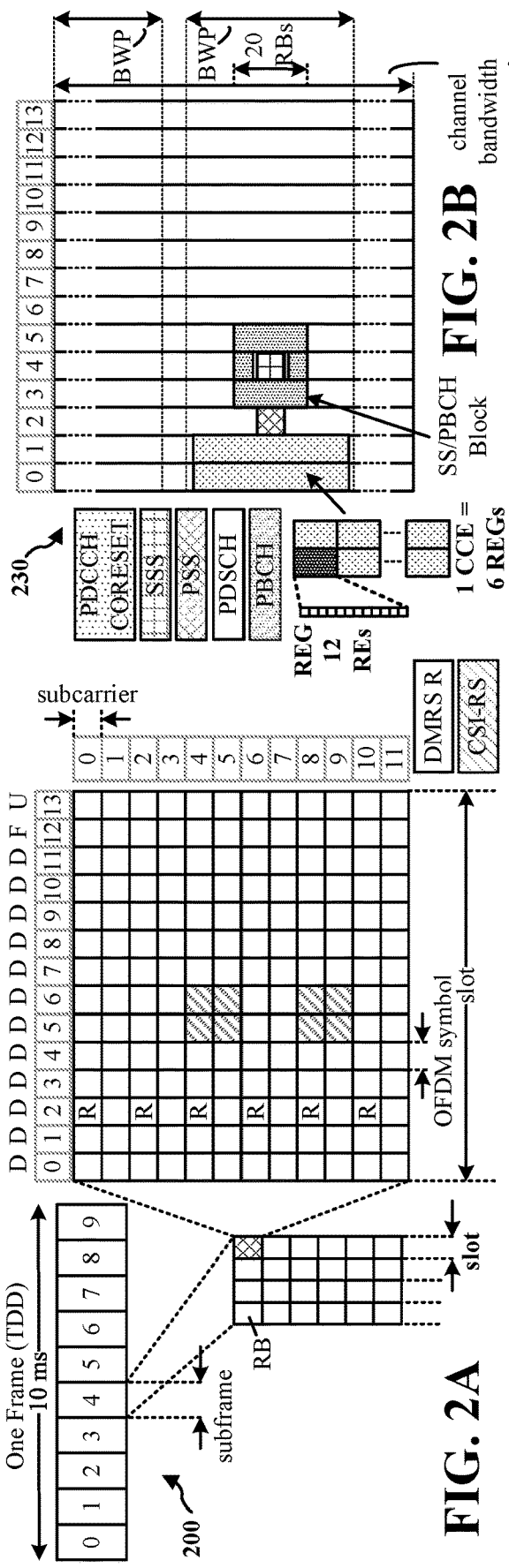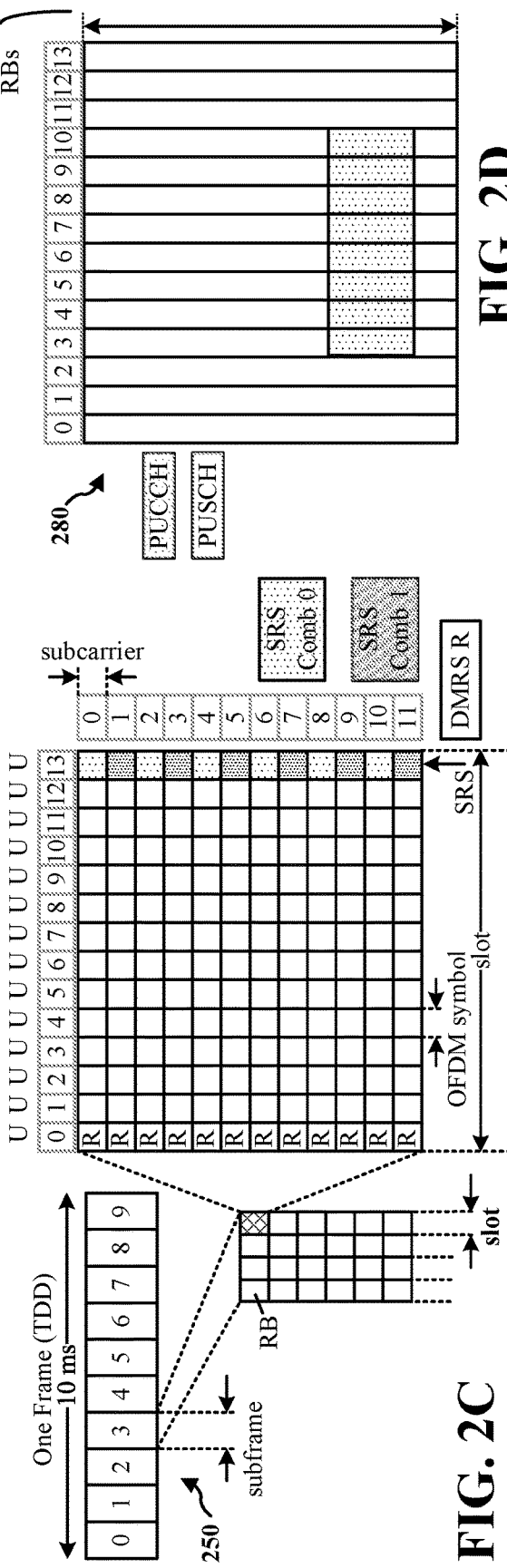
FIG. 2A
FIG. 2B
FIG. 2C
FIG. 2D

ASSISTED mmW SIDELINK BEAM DISCOVERY IN NON-STANDALONE MODE

TECHNICAL FIELD

The present disclosure relates generally to communication systems, and more particularly, to assisted millimeter wave (mmW) sidelink beam discovery in non-standalone mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, to an assisting node (AN), a request to access one or more assisting devices (ADs), the request based on an absence of at least one beam pair link (BPL) having a threshold quality of service (QoS) for a data radio bearer (DRB) with a second UE; receive, from the AN based on the transmitted request, an authorization to access the one or more ADs; and exchange, via the a signaling radio bearer (SRB), beam training information with the second UE based on the authorization to access the one or more ADs for performing a beam training procedure via the one or more ADs.

In another aspect of the disclosure, a method, a computer-readable medium, and an apparatus are provided. The apparatus may receive, from a first user equipment (UE), a request to access one or more ADs controlled by the AN, the request based on an absence of at least one BPL having a threshold QoS for a DRB between the first UE and a second UE; transmit, to the first UE based on the received request, an authorization to access the one or more ADs; and activate the one or more ADs to perform a second-stage BPL measurement between the first UE and the second UE via the one or more ADs and exchange beam training information over the SRB.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
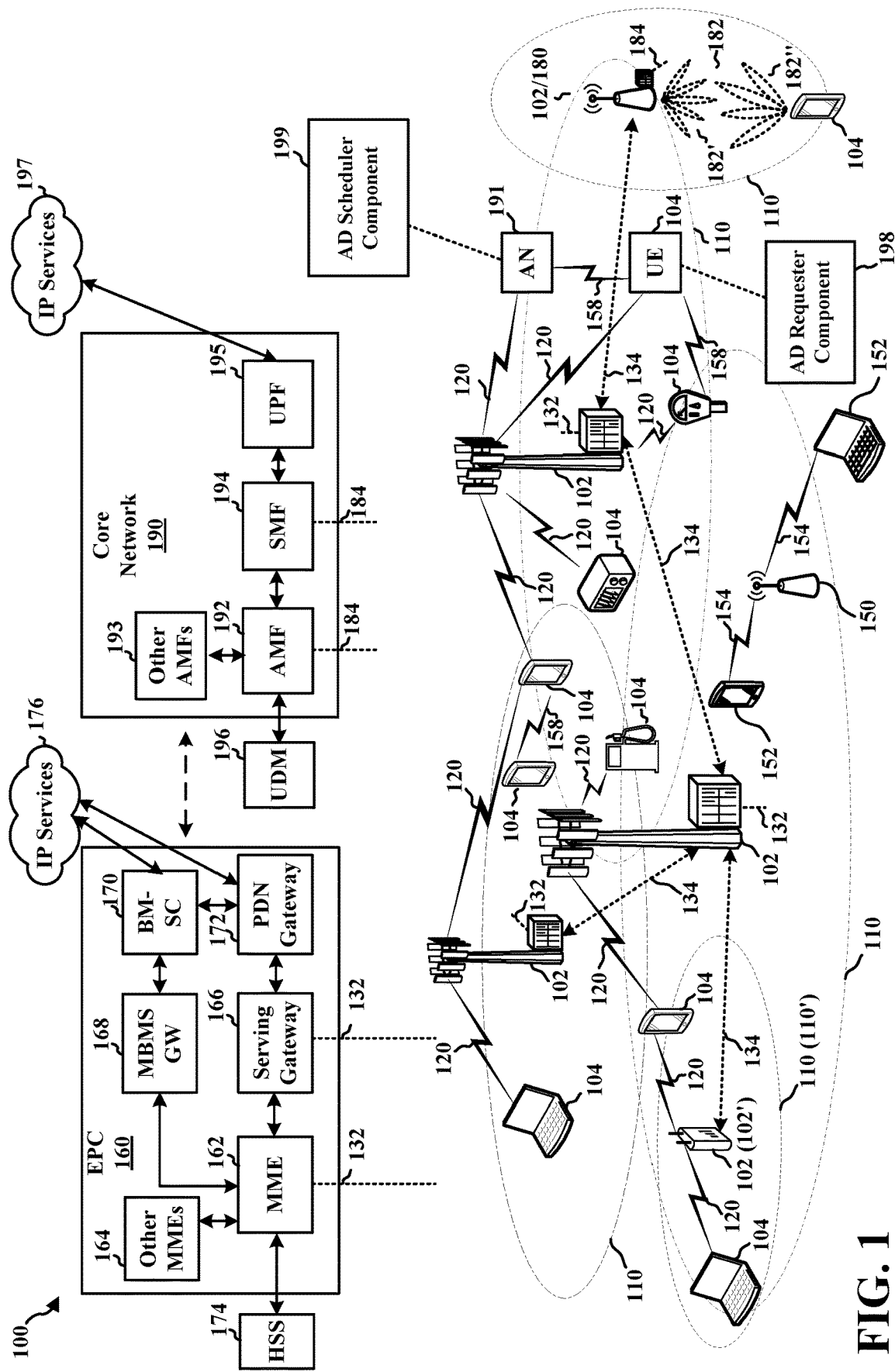
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range (FR) designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an assisting device (AD) requester component 198 configured to transmit, to an assisting node (AN), a request to access one or more ADs, the request based on an absence of at least one beam pair link (BPL) having a threshold quality of service (QoS) for a data radio bearer (DRB) with a second UE; receive, from the AN based on the transmitted request, an authorization to access the one or more ADs; and exchange, via a signaling radio bearer (SRB), beam training information with the second UE based on the authorization to access the one or more ADs for performing a beam training procedure via the one or more ADs. An AN 191 may be in communication with the UE 104 via the D2D communication link 158 and/or in communication with the base station 102 via the communication link 120. In certain aspects, the AN 191 may include an AD scheduler component 199 configured to receive, from a first UE, a request to access one or more ADs controlled by the AN, the request based on an absence of at least one BPL having a threshold QoS for a DRB between the first UE and a second UE; transmit, to the first UE based on the received request, an authorization to access the one or more ADs; and activate the one or more ADs to perform a second-stage BPL measurement between the first UE and the second UE via the one or more ADs and exchange beam training information over the SRB. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms)

may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
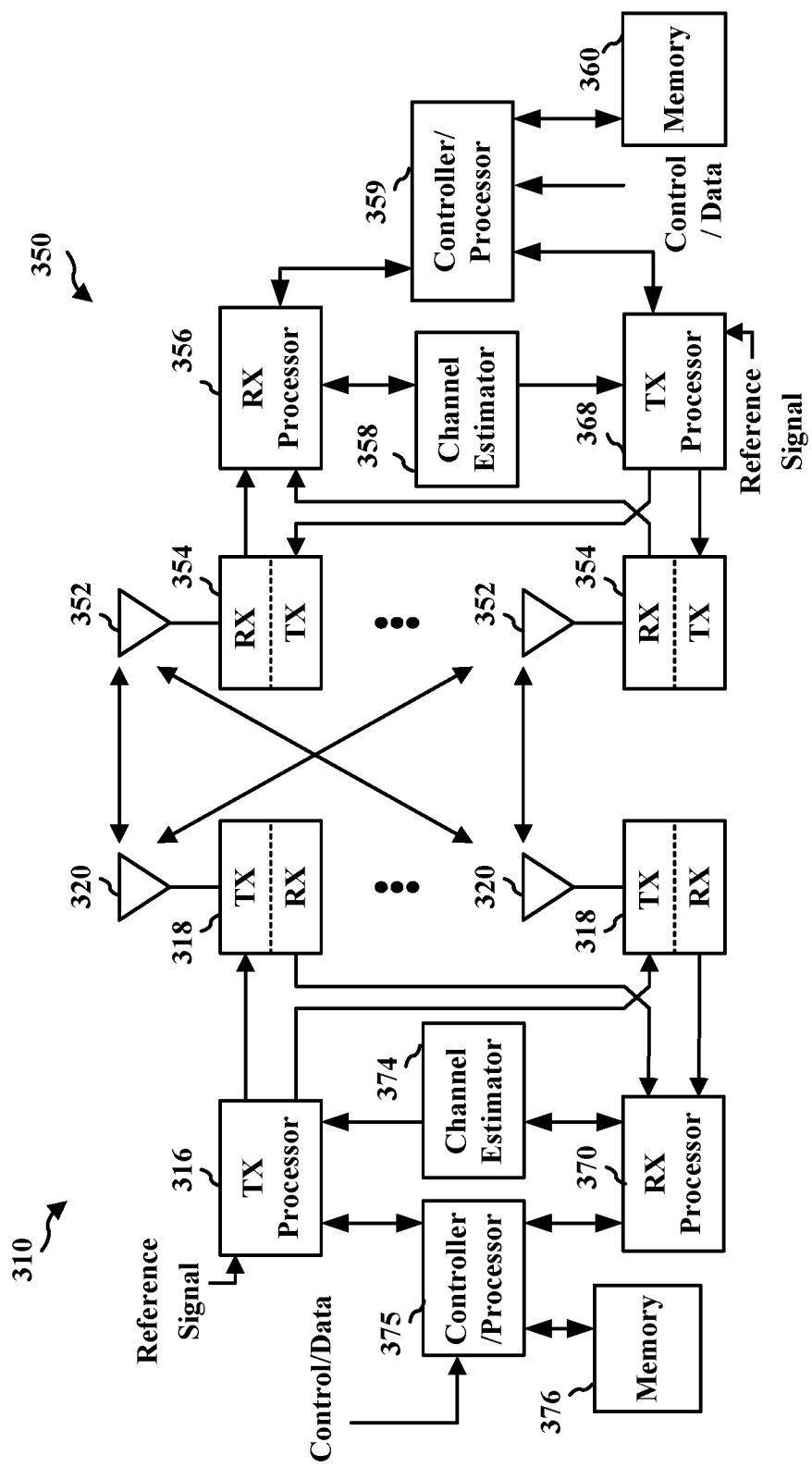
FIG. 3 is a diagram illustrating an example of an assisting node (AN) and user equipment (UE) in an access network.

FIG. 3 is a block diagram of a AN 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the AN 310. These soft decisions may be based on channel estimates computed by the channel estimator 358. The soft decisions are then decoded and deinterleaved to recover the data and control signals that were originally transmitted by the AN 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the AN 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the AN 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the AN 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the AD requester component 198 of FIG. 1.

At least one of the TX processor 316, the RX processor 370, and the controller/processor 375 may be configured to perform aspects in connection with the AD scheduler component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
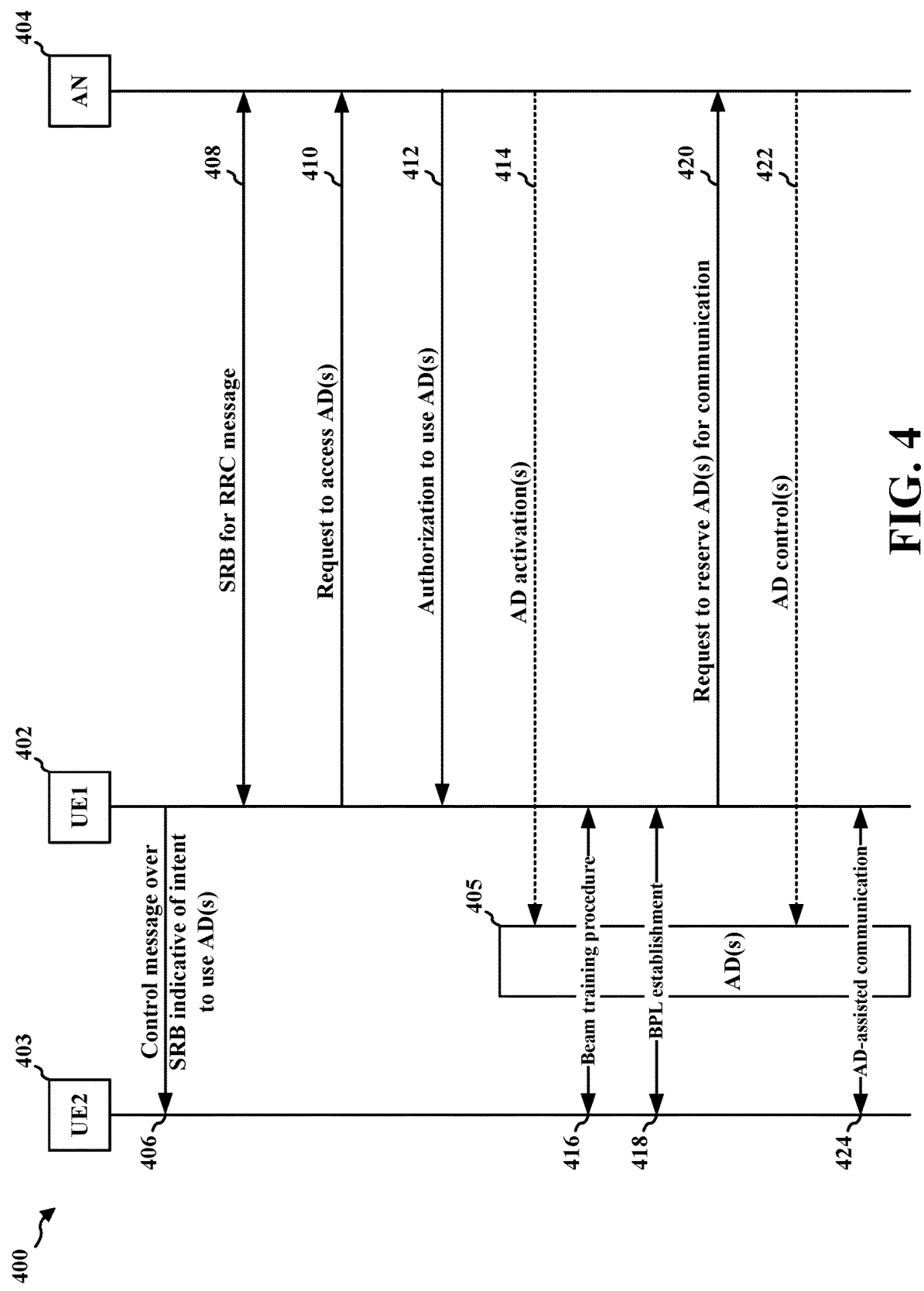
FIG. 4 is a call flow diagram illustrating communications between a first UE, a second UE, and an AN.

FIG. 4 is a call flow diagram 400 illustrating communications between a first UE 402, a second UE 403, and an AN 404. At 406, the first UE 402 may transmit a control message over an SRB to the second UE 403, which may be on FR1 or on FR2, where the control message may indicate that the first UE 402 intends to use one or more AD(s) 405 for improving a quality of a communication link with the second UE 403. For example, the first UE 402 may determine prior to transmitting the control message, at 406, that the first UE 402 does not have a BPL with the second UE 403 that satisfies a QoS for a DRB with the second UE 403.

At 408, the first UE 402 and the AN 404 may establish an SRB for exchanging an RRC message, if the SRB has not already been established between the first UE 402 and the AN 404. If the SRB has already been established between the first UE 402 and the AN 404, the SRB may be modified or updated to carry signaling for AD control/usage. Based on the SRB established/modified, at 408, the first UE 402 may transmit, at 410, a request to the AN 404 to access the AD(s) 405 for improving the quality of the communication link with the second UE 403. The AN 404 may transmit, at 412, an authorization to the first UE 402 to use the AD(s) 405 based on the request received, at 410, from the first UE 402 to access the AD(s) 405. The AN 404 may transmit, at 414, one or more AD activation(s) to the AD(s) 405. In examples, the AD activations may correspond to control information signaled to an AD controller for the AD(s) 405.

At 416, the first UE 402 may perform a beam training procedure with the second UE 403 via the AD(s) 405. The beam training procedure performed, at 416, via the AD(s) 405 may be associated with a beam training measurement and/or a beam training report. The beam training measurement and/or the beam training report may be used to establish, at 418, a BPL between the first UE 402 and the second UE 403 via the AD(s) 405.

At 420, the first UE 402 may transmit a request to the AN 404 to reserve one or more AD(s) 405 for communication with the second UE 403. For example, the one or more AD(s) 405 may have been determined by the first UE 402 based on the beam training procedure performed, at 416, to increase a quality of a communication link between the first UE 402 and the second UE 403. The AN 404 may transmit, at 422, AD control(s) to the AD(s) 405 based on the request received, at 420, from the first UE 402 to reserve the one or more AD(s) 405. At 424, the first UE 402 may communicate with the second UE 403 based on an AD-assisted communication. That is, the AD(s) 405 may assist communications between the first UE 402 and the second UE 403 based on techniques such as boosting, steering, reflecting, redirecting, etc., the signals transmitted between the first UE 402 and the second UE 403.

Figure 5:
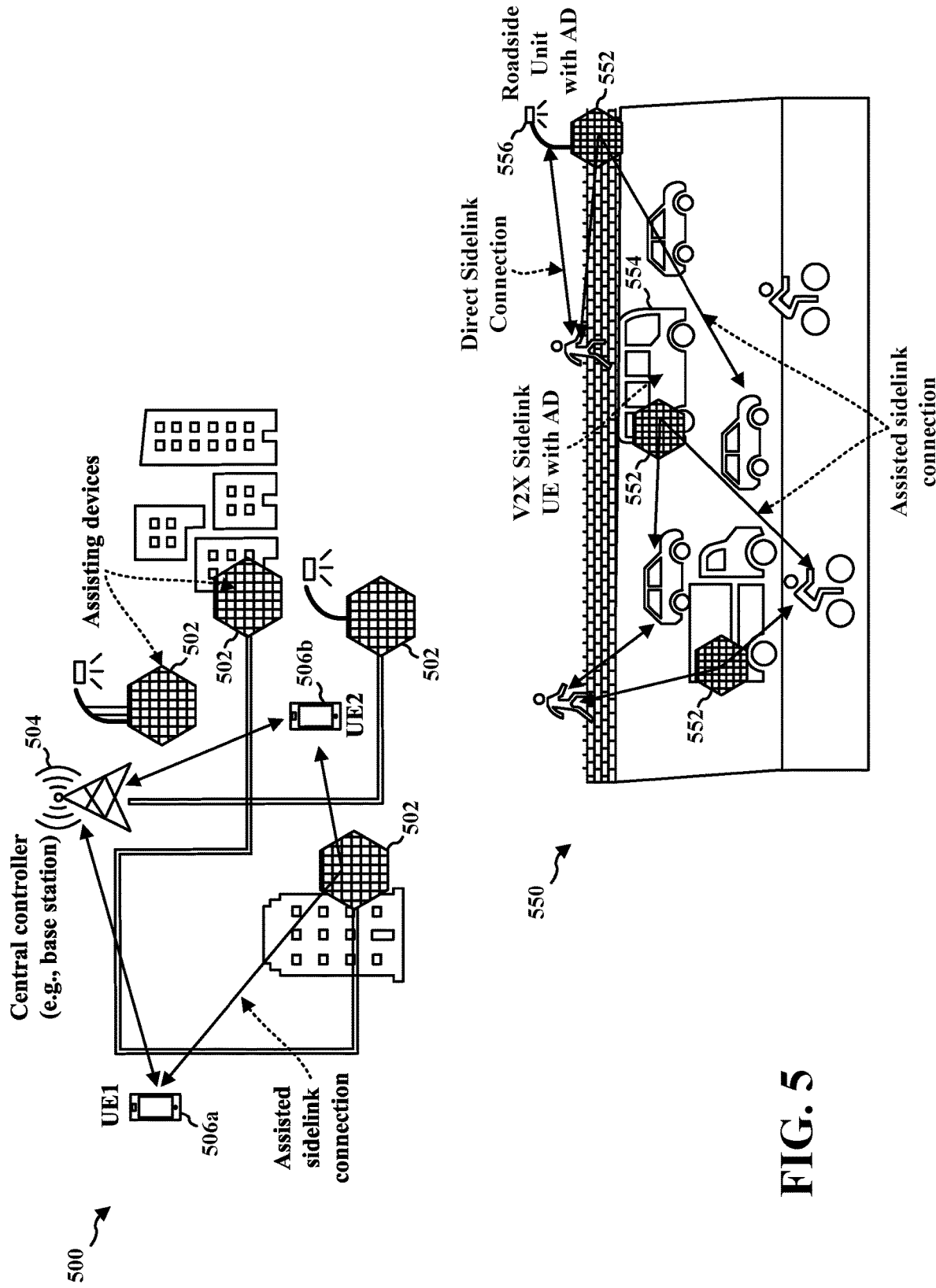
FIG. 5 illustrates network configuration diagrams for assisting devices (ADs) of a network.

FIG. 5 illustrates network configuration diagrams 500-550 for ADs 502/552. A sidelink network may include one or more ADs 502/552 in communication with one or more ANs that control the one or more ADs 502/552. In some cases, an AD controller may correspond to a central controller, such as a base station 504. The one or more ADs 502/552 may correspond to a reconfigurable intelligent surface (RIS), a repeater, a microwave relay, etc. The one or more ADs 502/552 may receive a signal from a transmitter UE, such as a first UE 506a, and boost/steer the received signal in a particular direction to a receiver UE, such as a second UE 506b, for an assisted sidelink connection. For instance, a RIS may reflect an incident beam in a controlled manner toward a particular direction. In another example, a repeater may amplify the signal and boost/increase a link quality associated with the signal.

Devices in the sidelink network may communicate with each other via sidelink channels with or without the use of the base station 504 to coordinate the communications. For example, the sidelink network may be a distributed network, as illustrated via network configuration diagram 550, that does not operate based on coverage from the base station 504. In cases such as the network configuration diagram 500, where a central entity such as the base station 504, is included in the network, the central entity may schedule and control the one or more ADs 502. However, if a central entity is not utilized for scheduling and controlling the one or more ADs 552, sidelink UEs in the network such as a vehicle-to-everything (V2X) sidelink UE 554 with an AD (e.g., one of ADs 552) or a roadside unit (RSU) 556 with an AD (e.g., one of ADs 552), may "discover" and coordinate with each other to control the one or more ADs 552. For example, an RIS associated with the V2X sidelink UE 554 may be controlled by an AN of the V2X sidelink UE 554 to reflect an incident beam in a particular direction. In some examples, UEs may also have a direct communication link with devices in the network, such as the RSU 556.

Accordingly, the network configuration diagram 500 corresponds to a sidelink network that includes centrally controlled ADs 502 and the network configuration diagram 550 corresponds to a sidelink network that includes distributed ADs (e.g., ADs 552). That is, the ADs 502 included in the network configuration diagram 500 may be controlled by the base station 504, which may operate as a central controller for the ADs 502. The base station 504 may transmit notifications to the first UE 506a and/or the second UE 506b included in the network indicative of one or more ADs 502 that are also included in the network. The base station 504 may schedule access times for the one or more ADs 502 and control/adjust a configuration of the one or more ADs 502 to improve communications between devices/nodes of the network. The base station 504 may schedule access to the one or more ADs 502 based on determining a position and/or a channel condition of a UE, such as the first UE 506a or the second UE 506b, that is connected to the base station 504.

In the network configuration diagram 550, distributed deployments for devices such as the V2X sidelink UE 554 (e.g., corresponding to vehicles), the RSU (e.g., mounted on a lamppost), etc., may be associated with the ADs 552 that are not controlled by a central network entity, such as the base station 504, but are instead controlled/configured via the distributed devices of the network. For example, one or more ADs 552 may be mounted on/included in objects associated with sidelink capabilities, which may be utilized for sidelink communications outside a coverage area of a base station. The sidelink devices may discover the one or more ADs 552 and communicate with other sidelink devices via the one or more ADs 552 with increased efficiency. Each of the ADs 552 may be controlled by an AN, which may correspond to a UE with sidelink capabilities. For example, a sidelink transceiver associated with a vehicle may be the AN.

Figure 6:
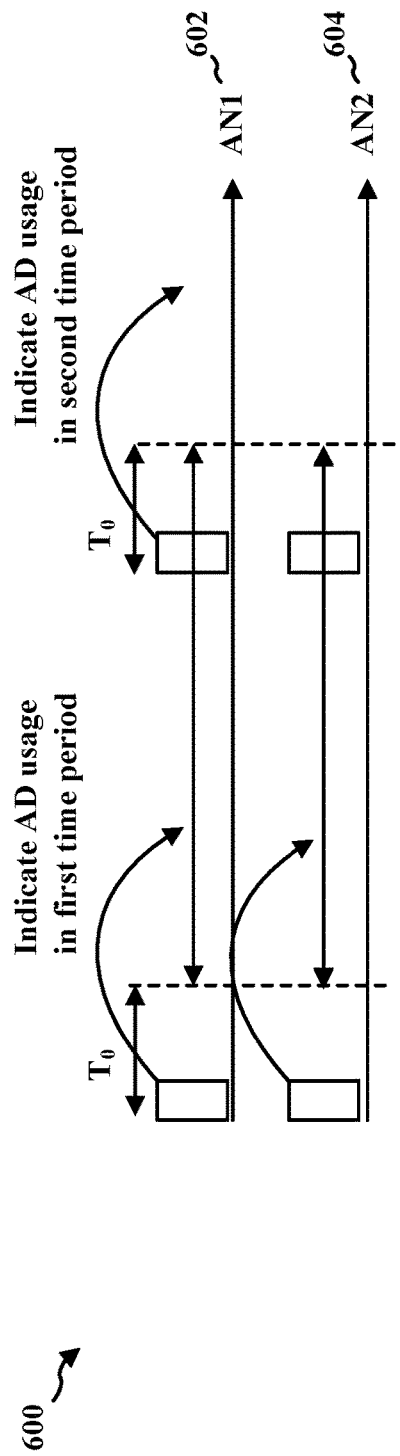
FIG. 6 illustrates AD usage notification diagrams.
Figure 6:
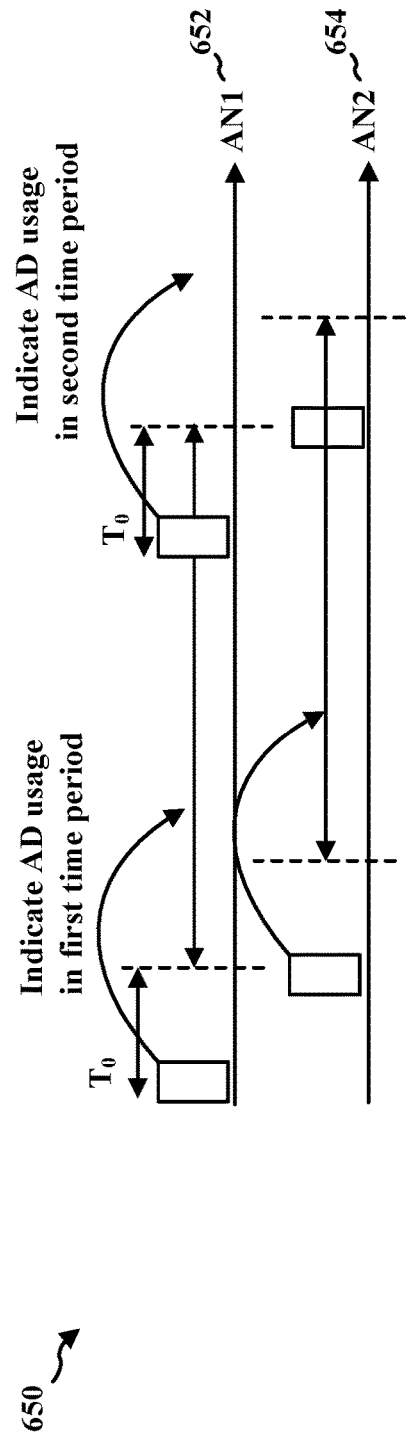

FIG. 6 illustrates AD usage notification diagrams 600-650. In distributed networks, such as in the network configuration diagram 550, one or more sidelink UEs may have sidelink communication capabilities via the one or more ADs. The sidelink UEs may determine that the one or more ADs are included in the network and may access/use the one or more ADs in a distributed manner (e.g., without a central scheduling entity). An AN that controls the one or more ADs may also include sidelink communication capabilities for communicating with the sidelink UEs. The AN may perform a discovery procedure for the sidelink UEs to determine a location of the one or more ADs within a communication environment. Following the discovery procedure, the sidelink UEs may reserve the one or more ADs via the AN. The AN may also broadcast reservation information for the sidelink UEs, which may improve reservation procedures within the network.

A discovery message generated by the AN for the discovery procedure may be broadcast based on model P techniques. ANs may be associated with model P and model Q techniques, which may be similar to model A and model B techniques used by sidelink UEs for discovery procedures. In model P, the broadcast capabilities of the AN may correspond to the application layer (e.g., for proximity service (ProSe) discovery messages). In examples, the discovery message may be a separate message for discovery of additional device capabilities. The broadcast discovery message may include any of a device identifier (ID) of the AN (e.g., layer 2 ID), remaining minimum system information (RMSI), a list of one or more ADs that are controlled by the AN, information indicative of a type(s) of the one or more ADs controlled by the AN, information indicative of AD and AN colocation (e.g., a quasi-colocation (QCL) assumption), location information (e.g., if the AD(s) and the AN are not collocated), frequency bands for which each of the ADs may operate (e.g., mmW, sub-6 GHz, or other carriers), etc. In examples, the frequency bands may be different from or the same as a current frequency band of operation, such as mmW for non-standalone procedures. Broadcasts from the AN may occur based on a fixed periodicity, which may be indicated by an upper layer or configured based on a predetermined protocol.

Information may be request from the AN by a sidelink UE based on Model Q techniques. For example, a sidelink UE with a degraded communication link may broadcast a request for assistance from one or more ADs. The request may be indicative of the sidelink UE with the degraded communication link, a UE group, a receiver/peer UE, location information, operational frequencies, etc. The discovery request may include information indicative of network traffic, QoS, periodicity, duration, priority, etc. Sidelink devices may be configured or preconfigured to perform the Model P and Model Q techniques.

A UE may either accept or reject a discovery request/message received from the AN. A rejection may be based on signal measurements, location information, UE protocols, etc. If the UE accepts the discovery request/message, the UE may transmit an AD discovery response message to the AN, which may correspond to an application layer discovery response message or a separate discovery response message. After receiving the discovery response, the AN and the UE may establish an SRB, if the SRB is not already established between the AN and the UE. If the SRB is already established between the AN and the UE, the UE may utilize the SRB to enable AD control signaling. The SRB may be established over a same frequency band or a different frequency band than the frequency band used by the UEs for establishing a DRB. The signaling may correspond to over-the-air (OTA) control information between the AN and the UE that is to be assisted by the one or more ADs.

The UE may request to reserve the one or more ADs for a particular time period, which may be repeated based on a periodicity, after establishing an RRC connection with the AN. For instance, the UE may request to reserve the first 5 slots in groups of every 50 slots, etc. In some cases, the UE may notify the AN of the frequency band for which the UE is requesting assistance from the one or more ADs. The AN may accept the request from the UE or reject the request from the UE. A rejection may indicate one or more opportunities that the UE may request an alternative reservation. In another example, the AN may indicate a TDD pattern to the UE for the UE to select resources for using the one or more ADs.

The UEs in the network may be notified of the AD usages by the ANs in the network. For example, a first AN 602/652 and a second AN 604/654 in the AD usage notification diagrams 600-650 may broadcast network-wide notifications of AD usages (e.g., based on a configured slot/frame and/or a configured period). Since distributed networks may not include a centralized controller/scheduling entity, proving each UE in the network with the AD usage schedules may improve an efficiency of the network. The UEs may perform reference signal received power (RSRP)-based resource exclusion and/or interference management procedures based on the AD usage schedules.

The first AN 602/652 and the second AN 654 may periodically broadcast future AD usage schedules to devices of the network. The broadcasts may include a list of ADs that are used in each transmission time interval (TTI), frame, subframe, slot duration, etc. Such information may be signaled in the AD usage notification diagrams 600-650 at time $T_0$ before a first TTI is signaled. The signaling may be further indicative of additional information, such as zones that may be impacted by the one or more ADs, the UEs that are requesting assistance from the one or more ADs, directional information, etc. In further examples, the additional information may be included in periodic discovery messages. The devices in the sidelink network may be preconfigured to transmit the AD usage information at a particular slot/frame, as illustrated in the AD usage notification diagram 600. Transmissions may be based on reservations by the ANs (e.g., the first AN 602/652 and the second AN 604/654), which may not include system-wide alignments in time in some configurations.

For the AD usage notification diagram 600, the UEs may transmit discovery messages at the same time (e.g., based on AD usage notifications with a configured period and a configured slot/frame). That is, the first AN 602 and the second AN 604 may indicate one or more AD usages for the configured period at the same time (e.g., for a first configured time period). During the configured period, the first AN 602 and the second AN 604 may similarly indicate one or more AD usages for a next configured period at the same time (e.g., for a second configured time period). The first AN 602 and the second AN 604 may indicate the usages at a second time $T_0$ during the configure period and corresponding to a threshold amount of time prior to the next configured period. The threshold amount of time associated with $T_0$ may correspond to a processing time for the devices of the sidelink network.

For the AD usage notification diagram 650, the UEs may transmit discovery messages at different times (e.g., based on AD usage notifications with a configured period but with no configured slot/frame). Thus, the AD usage indications for the first AN 652 and the second AN 654 may not be aligned system-wide in time. The first AN 652 may transmit a first AD usage indication for a first configured time period of the first AN 652, and the second AN 654 may transmit a corresponding first AD usage indication for a corresponding first time period of the second AN 654. A receiver UE that receives the first AD usage indication and the corresponding first AD usage indication may combine the received indications to determine a TDD pattern for the first AN 652 and the second AN 654.

Figure 7:
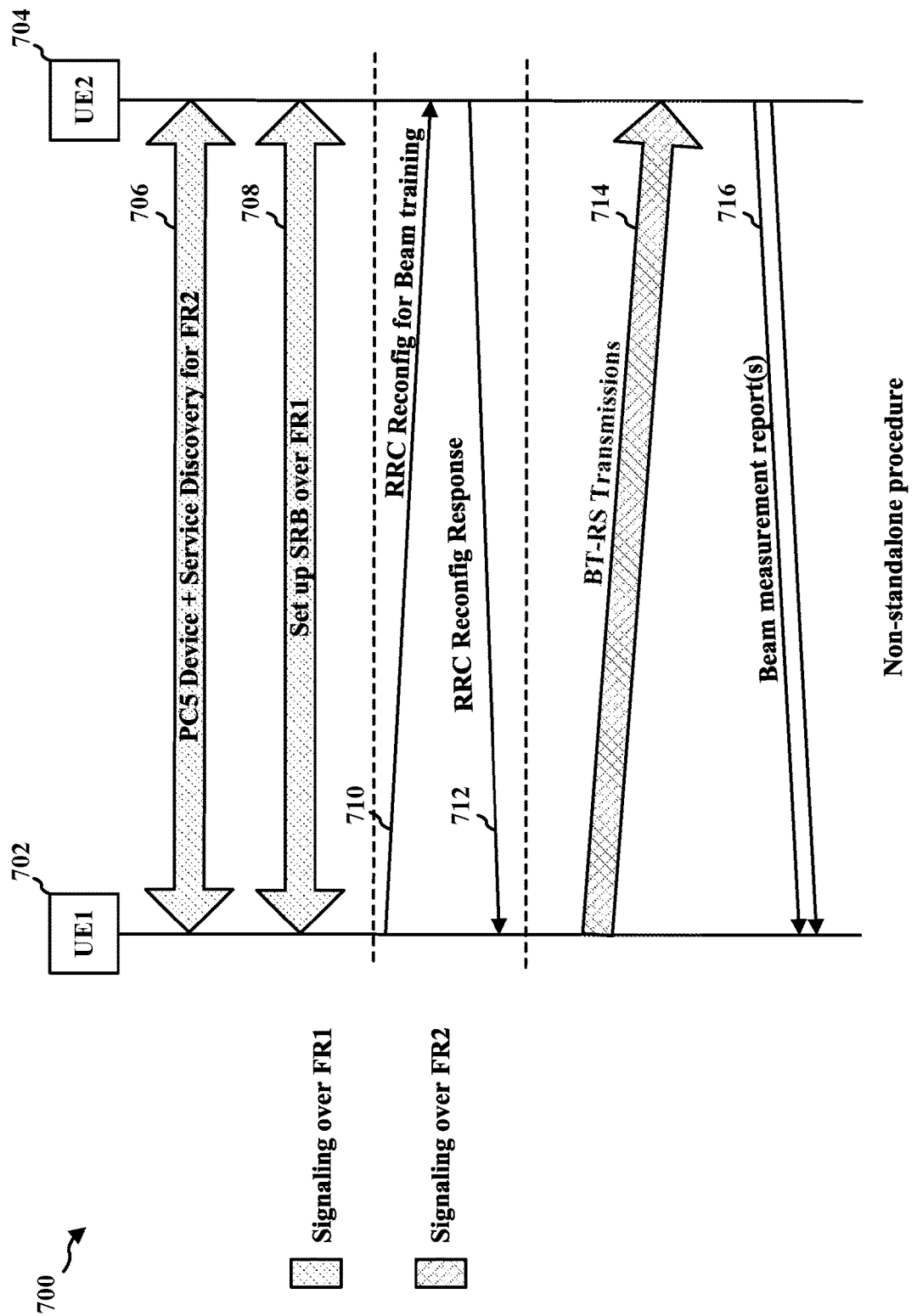
FIG. 7 is a communication diagram illustrating communications between a first UE and a second UE for a non-standalone procedure.

FIG. 7 is a communication diagram 700 illustrating communications between a first UE 702 and a second UE 704 for a non-standalone procedure. Beamformed transmissions by a sidelink UE over FR2 may correspond to a millimeter wave (mmW) frequency band. A first path loss associated with the mmW frequency band may be higher than a second path loss associated with other/lower frequency bands. Thus, a range of a wireless link associated with mmW transmissions of the first UE 702 and the second UE 704 may be based on beamforming and spatial filtering at the transmitters and the receivers of the first UE 702 and the second UE 704. FR1 transmissions may be associated with sub-6 GHz frequencies and may be transmitted omni-directionally. Thus, FR1 beams may be wider than FR2 beams.

Beam discovery and alignment procedures may be performed for mmW wireless systems. Communication nodes of the wireless systems may perform an initial beam alignment procedure prior to communicating over an FR2 link. The initial beam alignment procedure may correspond to an initial access procedure in Uu link configurations. The UEs may perform an initial/exhaustive search for nodes to configure a BPL. Beam discovery procedures over sidelink may include a sidelink UE forming a plurality of BPLs with a plurality of peer UEs. Such configurations may be in contrast to Uu link configurations, where each UE may form a BPL with the base station, rather than with multiple nodes. Thus, the initial beam discovery procedure in sidelink configurations may have a higher overhead than the initial access procedure for Uu link configurations, as each UE in the sidelink beam discovery procedures may establish a link to multiple peer UEs in the network.

Sidelink UEs that utilize mmW bands may include both mmW capabilities and sub-6 GHz capabilities. Sub-6 GHz channels may be used as an alternative to mmW channels, if the mmW channels are degraded, or to indicate control information for a mmW link. A mmW link associated with FR2 may be controlled and/or improved based on a sub-6 GHz link associated with FR1. For example, the sub-6 GHz link associated with FR1 may be used to assist a data transfer over the mmW link associated with FR2 as well as other higher frequency ranges.

The communication diagram 700 illustrates communications between the first UE 702 and the second UE 704 that may be performed for determining beam configurations, where initial control signaling may be exchanged over FR1. The control signals may correspond to short messages that may be transmitted over FR1 without a significant impact on spectral efficiency. DRBs, which may include an increased QoS (e.g., for data rates, etc.) may be established via mmW bands. For example, the DRBs may be established based on direct device discovery procedures and/or SRBs established over FR1.

A non-standalone sidelink mmW transmission may be based on a communication, at 706, over FR1 associated with a PCS device and service discovery for FR2. The DRB may be established by using the FR1 link to set up the SRB, at 708, for the first UE 702 and the second UE 704 to communicate. Beam training resources over the FR1 link may be negotiated between the first UE 702 and the second UE 704 for establishing the SRB.

Control messages may be exchanged over the FR1 link for the beam training procedures performed, at 714, over FR2. In examples, the first UE 702 may transmit, at 710, an RRC reconfiguration message to the second UE 704 for beam training, and the second UE 704 may transmit, at 712, an RRC reconfiguration response message to the first UE 702 based on the RRC reconfiguration message received, at 710. While the beam training may be performed over FR2 based on transmission, at 714, of a beam training reference signal (BT-RS) from the first UE 702 to the second UE 704, beam measurement report(s) associated with the BT-RS may be transmitted, at 716, from the second UE 704 to the first UE 702 over FR1, as FR1 may have a higher reliability than FR2. In further examples, the SRB may be formed over mmW bands using wide beams that may not support a high QoS associated with certain DRBs. In such cases, similar to non-standalone operations, the SRB may be formed based on a more reliable BPL with the wide beams, while the DRBs may be formed based on narrower beams having increased link capabilities.

After beam training measurements are performed for the beam training report(s) transmitted, at 716, the first UE 702 and the second UE 704 may determine the beams to use for establishing a connection with each other. Thus, the first UE 702 and the second UE 704 may establish the DRB and transmit information over the DRB. A failure to establish a mmW link may occur in some cases, such as where non-standalone UEs fail to establish a BPL for DRB establishment. The failure to establish the DRB may be based on candidate beams being blocked or based on the candidate beams not being able to provide a threshold QoS. In mmW configurations, the failure to establish the DRB may cause increased amounts of data (e.g., raw sensor information) to not be communicated between the first UE 702 and the second UE 704.

Figure 8:
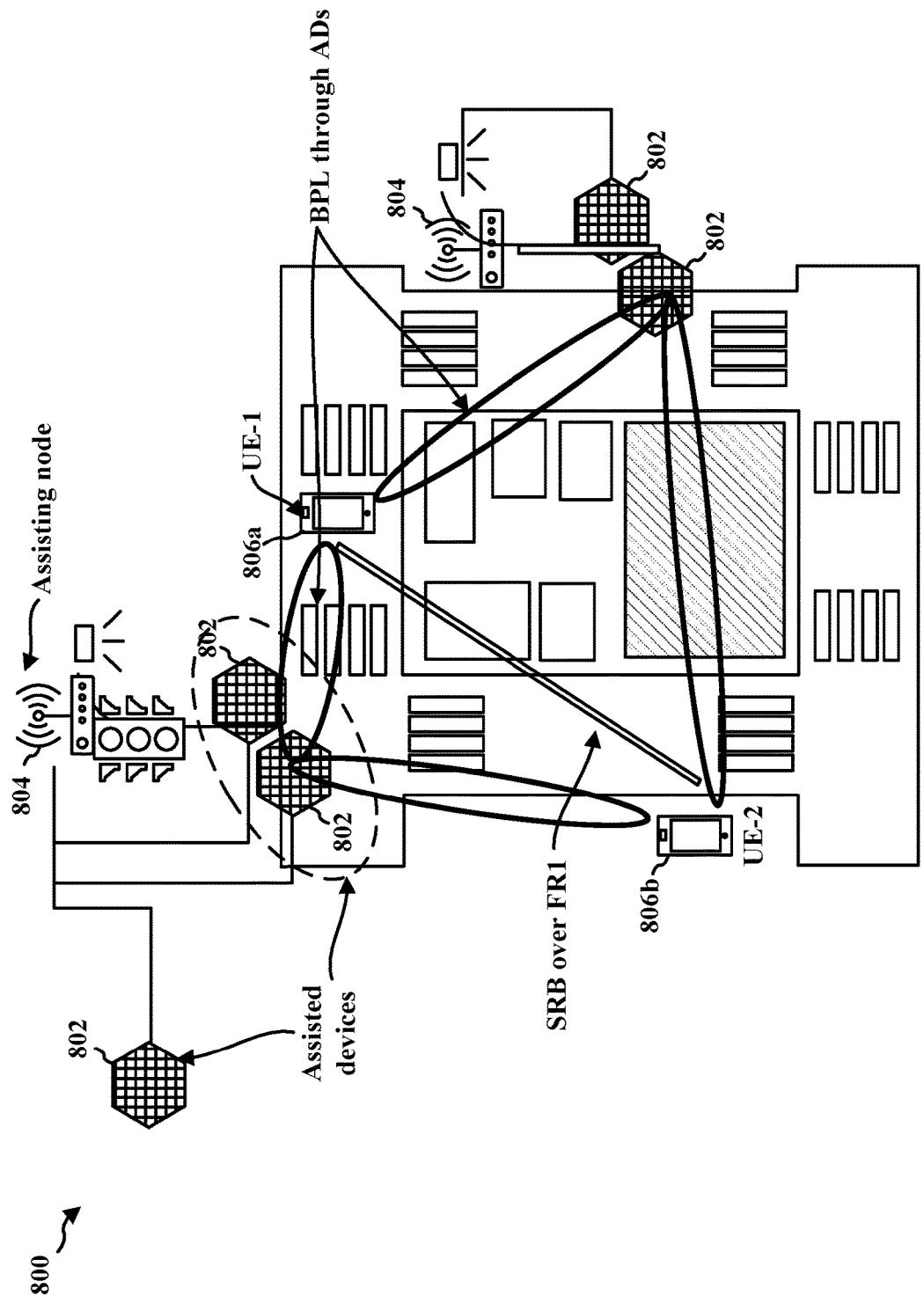
FIG. 8 is a diagram of a wireless communication environment that includes one or more ADs.

FIG. 8 is a diagram 800 of a wireless communication environment that includes one or more ADs 802. The one or more ADs 802 may correspond to a network relay, a repeater, a RIS, etc. The one or more ADs 802 may be configured to boost a signal strength and/or intelligently reflect a signal in a direction that improves a link quality between a first UE 806a and a second UE 806b. The one or more ADs 802 may be in communication with an AN 804 (e.g., via an AD controller), where the AN 804 may include sidelink capabilities associated with FR1, FR2, and/or other frequency ranges. The AN 804 and the one or more ADs 802 may or may not be collocated. The AN 804 may be configured to coordinate and control the AD usage schedules of the one or more ADs 802 by sidelink UEs in the network to increase a performance of the network. The coordination performed between the sidelink UEs and the AN 404 may be based on establishing a BPL through the one or more ADs 802.

In the diagram 800, the first UE 806a and the second UE 806b may establish an SRB over FR1 (e.g., for mmW sidelink non-standalone communications). However, the first UE 806a and the second UE 806b may have a weak or no mmW connection (e.g., based on a blockage or non-line-of-sight (NLoS) relative positions of the first UE 806a and the second UE 806b). Thus, the BPL may be established between the first UE 806a and the second UE 806b via the one or more ADs 802 deployed in the wireless communication environment. For example, the first UE 806a and the second UE 806b may determine to communicate with each other, but may be blocked by objects, such as buildings, that are located in the wireless communication environment. One or more communication paths may be provided between the first UE 806a and the second UE 806b based on reflection, redirection, boosting, and/or steering techniques by the one or more ADs 802. Accordingly, the first UE 806a may connect to the AN 804 over FR1 for establishing a mmW BPL with the second UE 806b via the one or more ADs 802. AD-aware beam training and beam search procedures controlled via communications with the AN 804 may be used for establishing the mmW BPL with the second UE 806b. The BPL may correspond to a link that has a highest gain and/or a highest quality.

In an example, the first UE 806a may determine that no BPL is initially available with the second UE 806b that satisfies a threshold QoS for establishing the DRB. The first UE 806a may notify the second UE 806b via the SRB (e.g., over FR1) that the first UE 806a will attempt to establish a BPL with the second UE 806b via the one or more ADs 802. The first UE 806a may determine a location of the one or more ADs 802 based on discovery messages received from one or more ANs (e.g., AN 804) that control the one or more ADs 802.

The first UE 806a may connect to the AN 804 and request access to the one or more ADs 802. The first UE 806a may transmit the request to each AN 804 from which the first UE 806a received a discovery message. The request to access the one or more ADs 802 may include additional information associated with the second UE 806b, if available. The first UE 806a may receive a list of candidate measurement/beam training periods from an i-th AN 804 based on $T_{i,1}^1$, $T_{i,2}^1$, ... $T_{i,M}^1$. The AN 804 and the first UE 806a may negotiate a number of beams for the first UE 806a and the second UE 806b to scan (e.g., based on $K_1$, $K_2$). The first UE 806a may scan $K_1$ beams and the second UE 806b may scan $K_2$ beams, such that a total measurement search space may correspond to $K_1 \times K_2$. The first UE 806a may perform the negotiations with the AN 804, as the AN 804 may not always be available for communication with the first UE 806a. The AN 804 may subsequently notify the first UE 806a of the total number of scans for the second UE 806b to perform, which may correspond to $N_1$.

The first UE 806a may receive an indication of multiple measurement/beam training occasions from a plurality of ANs (e.g., including AN 804). If possible, the first UE 806a may select the training periods to be aligned across the plurality of ANs (e.g., including AN 804). If possible, the first UE 806a may also request a separate training period from the plurality of ANs (e.g., including AN 804) to align the training periods. Aligning the training periods may reduce a time for performing the training. For example, $$\sum_i K_1 \times K_2 \times N_i \rightarrow \max_i (K_1 \times K_2 \times N_i),$$

where K corresponds to the number of scanned beams, N corresponds to the total number of scans, and i corresponds to an index of the one or more ADs 802. The AN 804 may reduce a size of the search space based on location information or past training information. The first UE 806a and the second UE 806b may be configured to exchange training information, such as post-training measurement reports. Based on the measurement reports, the first UE 806a and the second UE 806b may perform a final measurement to determine the one or more ADs 802 to use for establishing the BPL for the DRB.

The first UE 806a may determine to establish a BPL via the one or more ADs 802 based on a prior discovery of the ANs (e.g., including AN 804) and/or the ADs 802 in proximity to the first UE 806a. The first UE 806a may also initiate a discovery procedure for discovery of the ANs (e.g., including AN 804) in the network. After at least one AN (e.g., AN 804) is discovered by the first UE 806a, an RRC connection may be established between the first UE 806a and the at least one AN (e.g., AN 804). For instance, an SRB may also be established with the AN 804 over FR1, such that the first UE 806a may request the AN 804 to share measurement/beam training occasions based on an availability of the one or more ADs 802. The first UE 806a may notify the AN 804 of a number of beams that each of the first UE 806a and the second UE 806b may scan for establishing the BPL (e.g., based on $K_1$, $K_2$). The first UE 806a may notify the AN 804 of zone information or location information associated with the second UE 806b, if available. The first UE 806a may also notify the AN 804 of a position, location, zone information, etc., of the first UE 806a, if available. The AN 804 may indicate a list of measurement occasions that the first UE 806a may use with access to the one or more ADs 802. The AN 804 may also notify the first UE 806a of AD configurations (e.g., beams, reflection angle, etc.) for each measurement period, which may include cases where a single measurement period has multiple time-divided AD configurations.

Network communications may be improved based on location information and/or other predetermined information. For example, a Tx sweep may be reduced if a set of Tx beams are predetermined (e.g., based on beam training) to reach the one or more ADs 802 with a threshold QoS. In examples, a current or past mmW connection between the AN 804 and the first UE 806a may indicate to the AN 804 that the first UE 806a may be able to scan a particular sector/angle of the search space and may not have to perform a full Tx sweep. The AN 804 may notify the first UE 806a of criteria associated with the reduced scan, such as changing an elevation by $-\Delta\varphi$ to reach a particular AD (e.g., one of ADs 802). That is, the AN 804 may be configured to determine a set of AD configurations for the first UE 806a to communicate with the second UE 806b. The determination of the AN 804 may be based on location information, previous links, training information, etc. The AN 804 may indicate beam measurement occasions associated with particular AD configurations. In some cases, the indicated measurement occasions may be signaled to the first UE 806a as higher priority measurement occasions.

Figure 9:
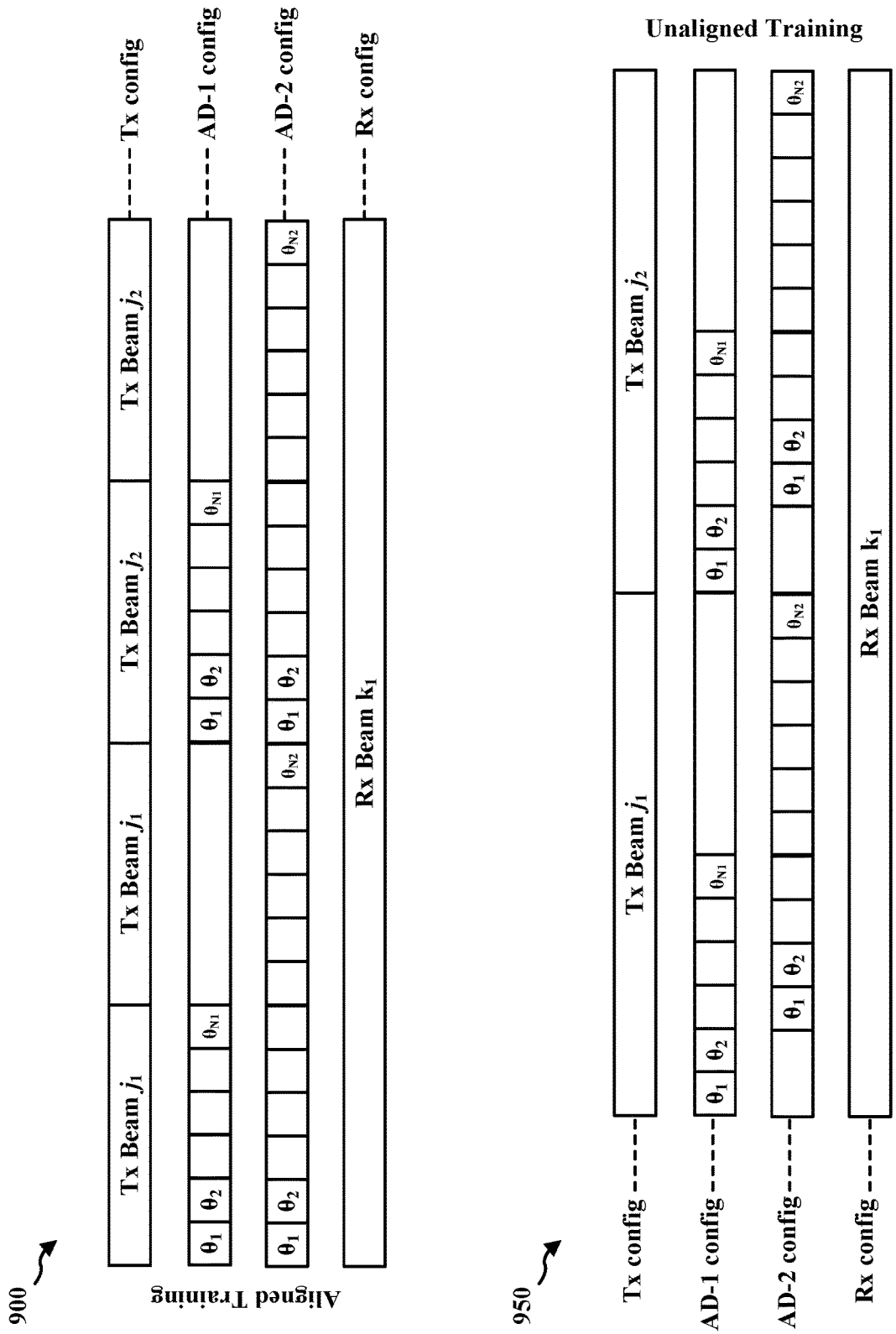
FIG. 9 includes diagrams illustrating aligned and unaligned beam training techniques.

FIG. 9 includes diagrams 900-950 illustrating aligned and unaligned beam training techniques. If the AN does not have information to reduce the search space, such as directional information, a full beam scan may not be performed by the UE. The UE may determine the lack of information at the AN based on the notification received from the AN. If a plurality of ANs and ADs are included in the communication environment and the UE determines to perform the full scan, the UE may select measurement periods from a set of measurement periods received for aligning the beam training procedures in time, as illustrated in the diagram 900. If the UE is unable to align the beam training procedures in time, the UE may request one or more AN to offset the measurement periods for alignment. If the offset request is rejected, unaligned beam training procedures may be performed by the UE, if possible, as illustrated in the diagram 950. If unaligned beam training is not possible, the UE may request a training resource from one of the ANs that is later in time. The UE may select measurement periods for each AN and AD to perform beam training separately (e.g., if the AN is able to reduce the search space). The UE may request the AN to provide a new grant, which may be later in time, if current measurement periods collide.

In the diagram 900, an aligned beam training procedure for two AD configurations may include two Tx beams and one Rx beam. The Tx configuration pattern may be repeated for multiple Rx beams. For a single Rx beam, such as Rx beam $k_1$, the Tx configuration may include two Tx beams that correspond to Tx beam $j_1$ and Tx beam $j_2$. A first AD configuration may be active for Tx beam $j_1$ from $\theta_1$ to $\theta_{N1}$, and a second AD configuration may be active for Tx beams $j_1$ and $j_2$ from $\theta_1$ to $\theta_{N2}$, where N2>N1. Thus, the first AD may be switched off during periods associated with Tx beam $j_2$. The Rx configuration may correspond to the single Rx beam $k_1$, which may be used to perform the measurement.

For unaligned beam training procedures in the diagram 950, the first AD may similarly utilize Tx beam $j_1$, but over a longer period than used for the aligned beam training configuration in the diagram 900. Thus, the longer period may allow the first AD configuration and the second AD configuration to start and end at different times during both Tx beams $j_1$ and $j_2$, as illustrated in the diagram 950, as the first AD configuration and the second AD configuration may have different periodicities. The UE may receive beam pilots/beam training reference signals after completion of the beam training procedure and transmit a measurement report to a peer UE over the SRB. The measurement report may include a set of measurements associated with BPLs that may satisfy the threshold QoS for the DRB. The measurement report may also include an indication of a time of the measurement occasion at which the measurement was performed.

The first UE may receive the measurement report from the second UE and determine a link from the first UE to an AD to the second UE. If multiple ADs are available, the first UE may request the AN to reserve particular ADs during a requested measurement period. For instance, if $AN_1$ controls $AD_{1,1}$ and $AD_{1,2}$, and $AN_2$ controls $AD_{2,1}$, and two high QoS BPLs are determined, the first UE may request $AN_1$ to reserve $AD_{1,1}$ and $AD_{1,2}$ for slots $T_m$, and $T_n$, respectively, and request $AN_2$ to reserve $AD_{2,1}$ for slot $T_k$, where $T_m$, $T_n$, and $T_k$ are non-overlapping and long enough in duration for measuring the two high QoS BPLs. The first UE may notify the AN of one or more slots over which the beam was measured and the AN may configure the AD based on the configuration used for the one or more slots. The first UE and the second UE may use the second beam training occasion to determine the one or more ADs that may be used for the BPL. The first UE may measure the BPL for the active ADs to determine the AD to use for establishing the BPL.

After completion of the beam discovery process, the first UE may request to reserve the one or more ADs associated with the best BPL for future slots, where the reservation may be based on a traffic pattern, application protocol, etc. The request to reserve the one or more ADs associated with BPLs that satisfy the QoS threshold may be transmitted for short measurement occasions. For example, short measurement occasions may allow a set of secondary BPLs to be maintained that may be used if a primary BPL degrades.

Figure 10:
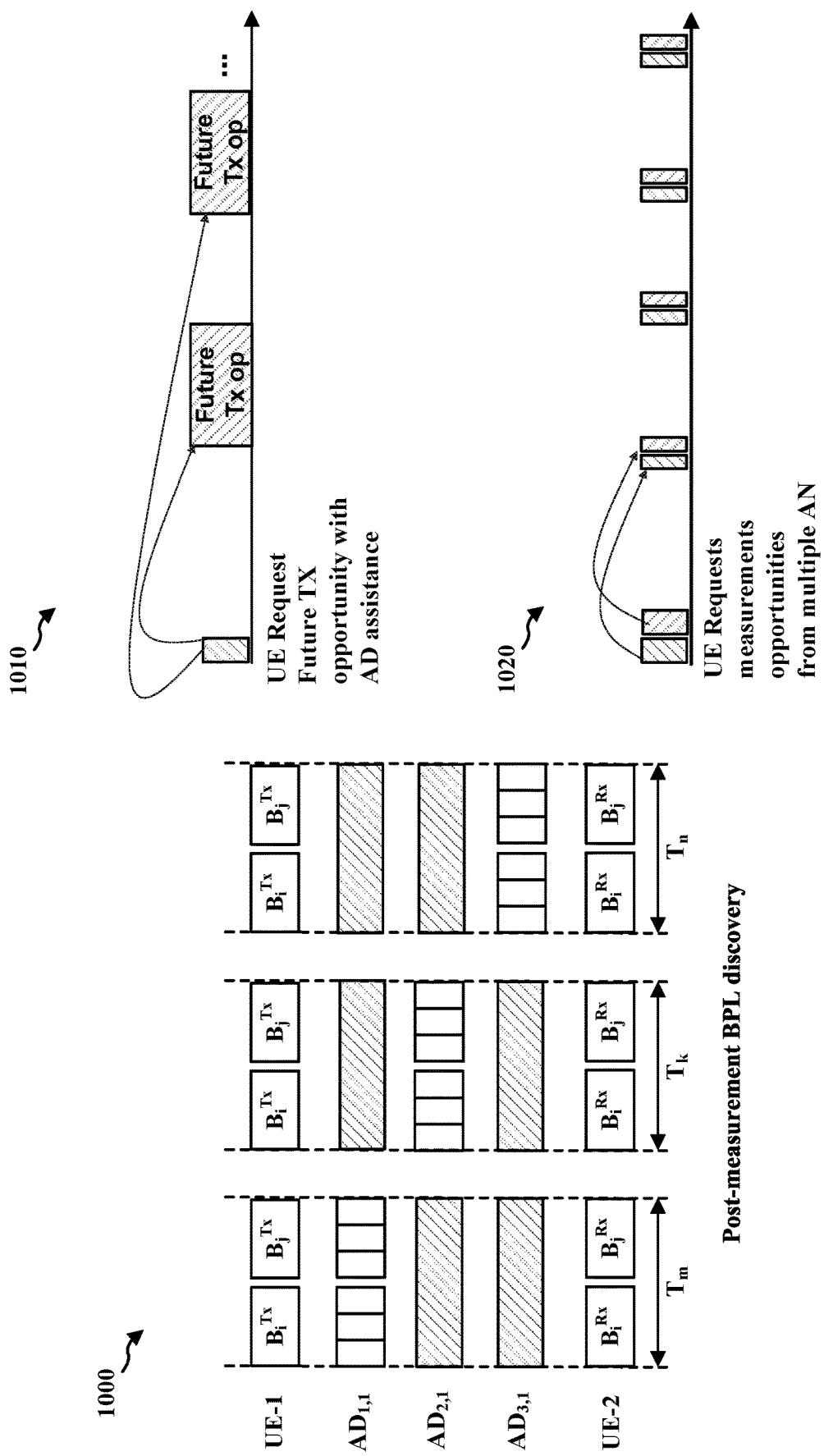
FIG. 10 includes diagrams illustrating post-measurement beam pair link (BPL) procedures.

FIG. 10 includes diagrams 1000-1020 illustrating post-measurement BPL procedures. In the diagram 1000, for post-measurement BPL discovery, a first UE and/or a second UE may request the AN to re-reserve and cycle through the one or more ADs (e.g., $AD_{1,1}$, $AD_{2,1}$, $AD_{3,1}$) that were associated with the highest received signal quality. The UE may determine Tx and Rx beams that the UE used for the periods associated with the high signal quality. For example, the UE may request that the first AD be activated/turned on with a particular configuration, so that the UE may measure and determine a best BPL to establish over beams $B_i^{Tx}$ and $B_i^{Rx}$, or $B_j^{Tx}$ and $B_j^{Rx}$. A similar procedure may be performed for the second AD and the third AD in the diagram 1000. Based on such techniques, the UE may determine a first set of one or more AD configurations that provide the best link qualities, a second set of one or more AD configurations that provide the next best link qualities, etc. In some examples, the procedure may be based on the search space being small enough to perform the process in a short amount of time.

The diagrams 1010-1020 illustrate post-measurement BPL Tx opportunities and measurement opportunities. For example, in the diagram 1000, the UE may request future Tx opportunities based on assistance from the one or more ADs. The UE may request the AN to reserve the one or more ADs for future Tx opportunities for which the UE may use the DRB for the one or more ADs. In the diagram 1020, the UE may request measurement opportunities from multiple ANs. Thus, the UE may request the ANs to make short reservations for the ADs that the UE does not use for establishing the BPL, so that the UE may perform short measurements for a secondary BPL direction or track a secondary link in case the primary link/DRB degrades.

Figure 11:
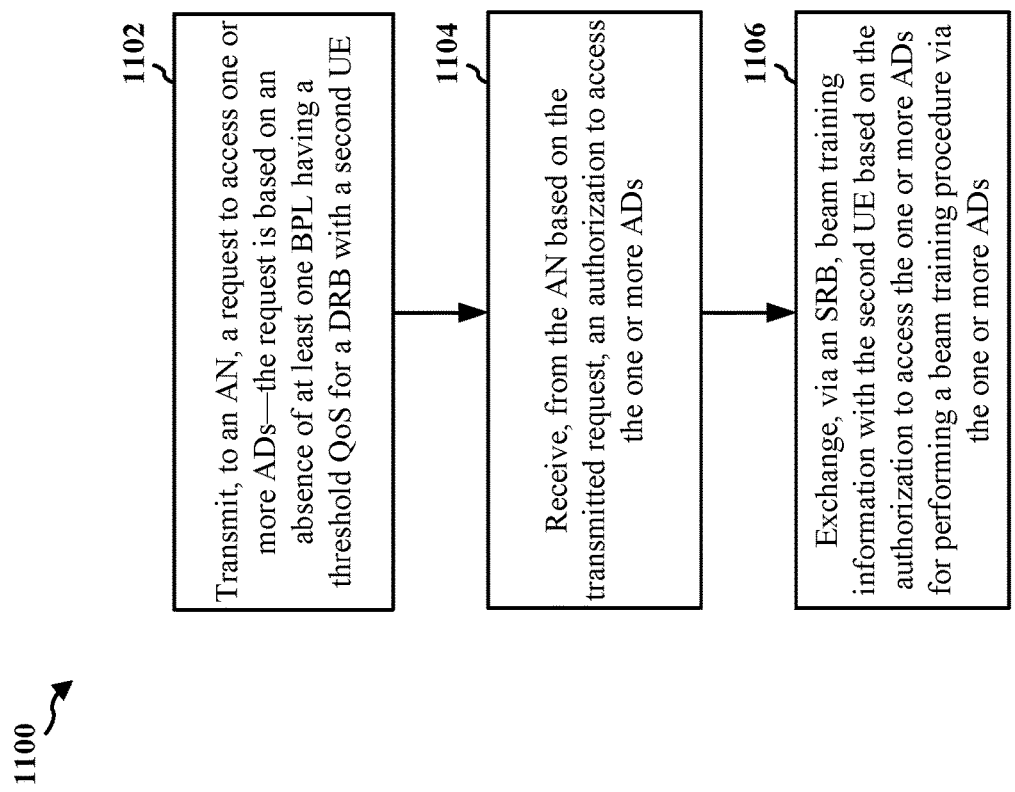
FIG. 11 is a flowchart of a method of wireless communication at a UE.

FIG. 11 is a flowchart 1100 of a method of wireless communication. The method may be performed by a UE (e.g., the UE 104, 402-403, 506a-506b, 702, 806a-806b; the apparatus 1502; etc.), which may include the memory 360 and which may be the entire UE 104, 402-403, 506a-506b, 702, 806a-806b or a component of the 104, 402-403, 506a-506b, 702, 806a-806b, such as the TX processor 368, the RX processor 356, and/or the controller/processor 359.

At 1102, the UE may transmit, to an AN, a request to access one or more ADs—the request is based on an absence of at least one BPL having a threshold QoS for a DRB with a second UE. For example, referring to FIG. 4, the first UE 402 may transmit, at 410, a request to the AN 404 to access the AD(s) 405. The request to access the AD(s) 405 transmitted, at 410, may be based on a degraded communication link between the first UE 402 and the second UE 403. The transmission, at 1102, may be performed by the transmission component 1534 of the apparatus 1502 in FIG. 15.

At 1104, the UE may receive, from the AN based on the transmitted request, an authorization to access the one or more ADs. For example, referring to FIG. 4, the first UE 402 may receive, at 412, an authorization from the AN 404 to use the AD(s) 405 in response to the request transmitted, at 410, to access the AD(s) 405. The reception, at 1104, may be performed by the reception component 1530 of the apparatus 1502 in FIG. 15.

At 1106, the UE may exchange, via an SRB, beam training information with the second UE based on the authorization to access the one or more ADs for performing a beam training procedure via the one or more ADs. For example, referring to FIG. 4, the first UE 402 may perform, at 416, a beam training procedure with the second UE 403.

The beam training procedure may be performed, at 416, via the AD(s) 405 based on the authorization received, at 412, from the AN 404 to use the AD(s) 405. The exchange, at 1106, may be performed by the exchanger component 1542 of the apparatus 1502 in FIG. 15.

Figure 12:
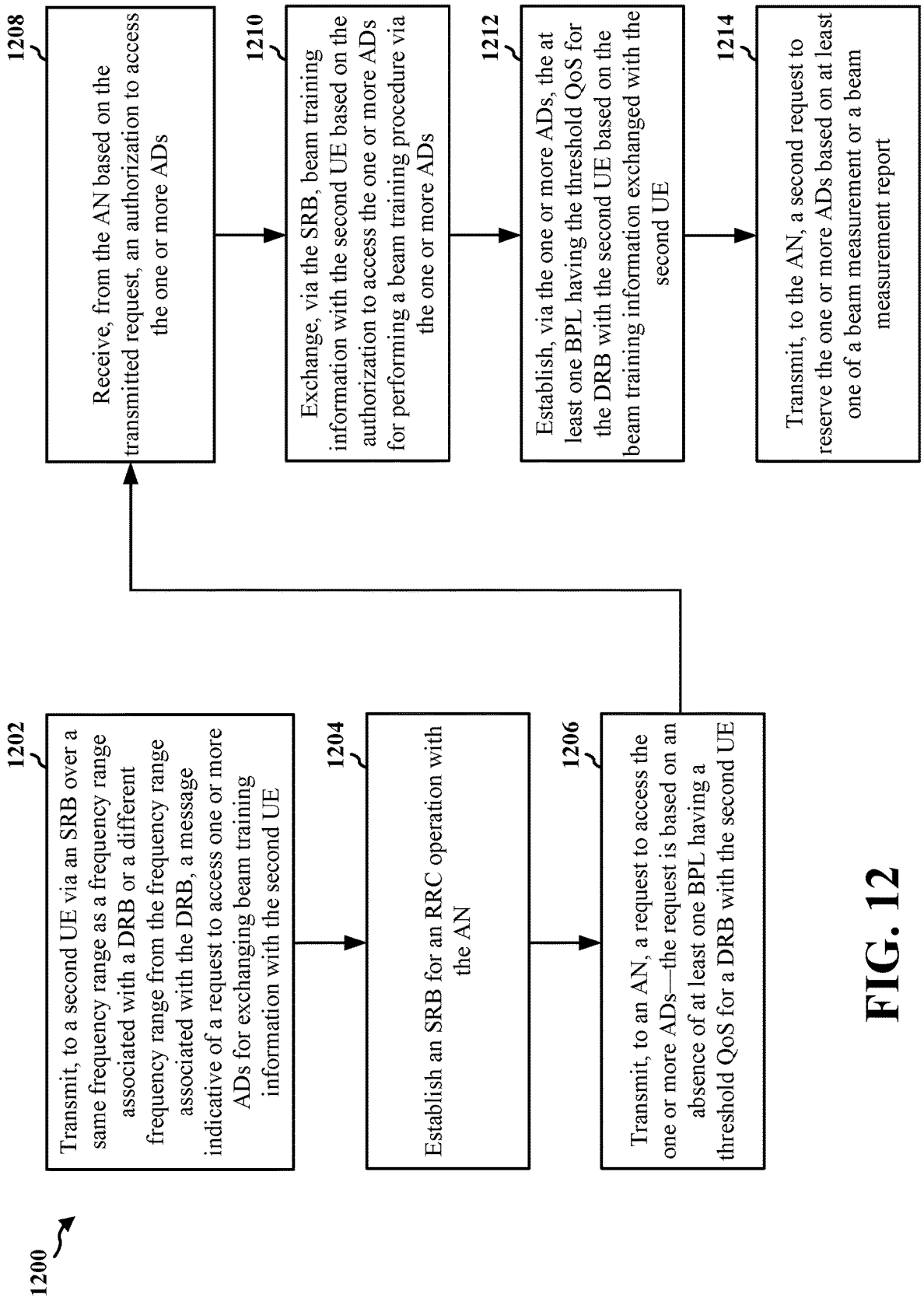
FIG. 12 is a flowchart of a method of wireless communication at a UE.

FIG. 12 is a flowchart 1200 of a method of wireless communication. The method may be performed by a UE (e.g., the UE 104, 402-403, 506a-506b, 702, 806a-806b; the apparatus 1502; etc.), which may include the memory 360 and which may be the entire UE 104, 402-403, 506a-506b, 702, 806a-806b or a component of the 104, 402-403, 506a-506b, 702, 806a-806b, such as the TX processor 368, the RX processor 356, and/or the controller/processor 359.

At 1202, the UE may transmit, to a second UE via an SRB over a same frequency range as a frequency range associated with a DRB or a different frequency range from the frequency range associated with the DRB (e.g., over FR1 or over mmW), a message indicative of a request to access one or more ADs for exchanging beam training information with the second UE. For example, referring to FIG. 4, the first UE 402 may transmit, at 406, an FR1 message to the second UE 403 indicative of an intent to use AD(s) 405 for communicating with the second UE 403. The transmission, at 1202, may be performed by the transmission component 1534 of the apparatus 1502 in FIG. 15.

At 1204, the UE may establish an SRB for an RRC operation with the AN. For example, referring to FIG. 4, the first UE 402 may establish, at 408, an SRB for the RRC message with the AN 404. The establishing, at 1204, may be performed by the establishment component 1540 of the apparatus 1502 in FIG. 15.

At 1206, the UE may transmit, to an AN, a request to access the one or more ADs—the request is based on an absence of at least one BPL having a threshold QoS for a DRB with the second UE. For example, referring to FIG. 4, the first UE 402 may transmit, at 410, a request to the AN 404 to access the AD(s) 405. The request to access the AD(s) 405 transmitted, at 410, may be based on a degraded communication link between the first UE 402 and the second UE 403. The request transmitted, at 410, to access the one or more AD(s) 405 may include information indicative of at least one of a first location of the first UE 402 or a second location of the second UE 403. The request to access the one or more AD(s) 405 may be transmitted, at 410, to the AN based on a discovery procedure associated with at least one of the AN 404 or the one or more AD(s) 405. The transmission, at 1206, may be performed by the transmission component 1534 of the apparatus 1502 in FIG. 15.

At 1208, the UE may receive, from the AN based on the transmitted request, an authorization to access the one or more ADs. For example, referring to FIG. 4, the first UE 402 may receive, at 412, an authorization from the AN 404 to use the AD(s) 405 in response to the request transmitted, at 410, to access the AD(s) 405. The authorization received, at 412, to access the one or more AD(s) 405 may corresponds to at least one of one or more beam training periods, a configuration of the one or more AD(s) 405, a number of beams to be scanned by the first UE 402 and the second UE 403, or a total number of scans to be performed by the first UE 402 and the second UE 403. The one or more beam training periods may be aligned for a plurality of ANs that include the AN 404, or the one or more beam training periods may be unaligned for the plurality of ANs that include the AN 404. The reception, at 1208, may be performed by the reception component 1530 of the apparatus 1502 in FIG. 15.

At 1210, the UE may exchange, via the SRB, beam training information with the second UE based on the authorization to access the one or more ADs for performing a beam training procedure via the one or more ADs. For example, referring to FIG. 4, the first UE 402 may perform, at 416, a beam training procedure with the second UE 403. The beam training procedure may be performed, at 416, via the AD(s) 405 based on the authorization received, at 412, from the AN 404 to use the AD(s) 405. Beam training information exchanged (e.g., at 416) with the second UE 403 may correspond to at least one of a beam measurement or a beam measurement report. The beam measurement report may be indicative of at least one of a time that the beam measurement was performed or the at least one BPL having the threshold QoS for the DRB with the second UE 403. Beam training information (e.g., communicated at 416) may correspond to separate beam training periods for each AD included in the one or more AD(s) 405. The exchange, at 1210, may be performed by the exchanger component 1542 of the apparatus 1502 in FIG. 15.

At 1212, the UE may establish, via the one or more ADs, the at least one BPL having the threshold QoS for the DRB with the second UE based on the beam training information exchanged with the second UE. For example, referring to FIG. 4, the first UE 402 may establish, at 418, a BPL with the second UE 403 based on the beam training procedure performed, at 416, with the second UE 403. The establishing, at 1212, may be performed by the establishment component 1540 of the apparatus 1502 in FIG. 15.

At 1214, the UE may transmit, to the AN, a second request to reserve the one or more ADs based on at least one of a beam measurement or a beam measurement report. For example, referring to FIG. 4, the first UE 402 may transmit, at 420, a request to the AN 404 to reserve the AD(s) 405 for communication with second UE 403. The request transmitted, at 420, to reserve the AD(s) 405 may be based on a beam measurement and/or a beam measurement report associated with the beam training procedure performed, at 416, with the second UE 403. The transmission, at 1214, may be performed by the transmission component 1534 of the apparatus 1502 in FIG. 15.

Figure 13:
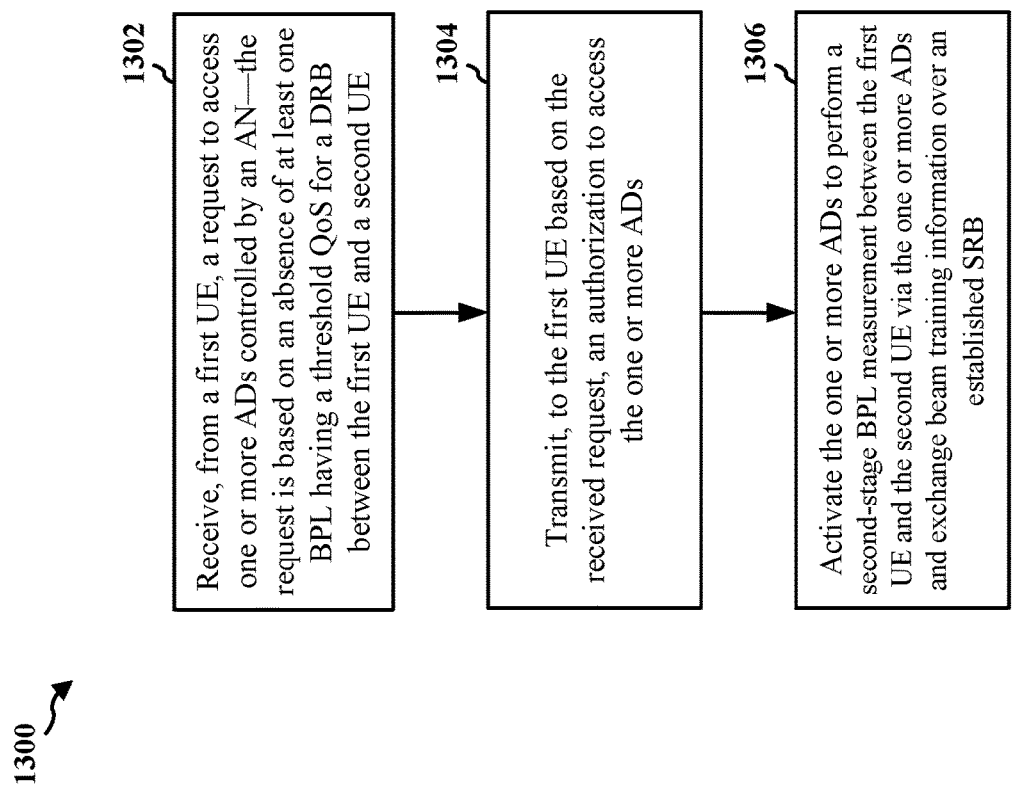
FIG. 13 is a flowchart of a method of wireless communication at an AN.

FIG. 13 is a flowchart 1300 of a method of wireless communication. The method may be performed by an AN (e.g., the AN 191, 404, 804; the apparatus 1602; etc.), which may include the memory 376 and which may be the entire AN 191, 404, 804 or a component of the AN 191, 404, 804, such as the TX processor 316, the RX processor 370, and/or the controller/processor 375.

At 1302, the AN may receive, from a first UE, a request to access one or more ADs controlled by an AN—the request is based on an absence of at least one BPL having a threshold QoS for a DRB between the first UE and a second UE. For example, referring to FIG. 4, the AN 404 may receive, at 410, a request from the first UE 402 to access the AD(s) 405. The request to access the AD(s) 405 received, at 410, may be based on a degraded communication link between the first UE 402 and the second UE 403. The reception, at 1302, may be performed by the reception component 1630 of the apparatus 1602 in FIG. 16.

At 1304, the AN may transmit, to the first UE based on the received request, an authorization to access the one or more ADs. For example, referring to FIG. 4, the AN 404 may transmit, at 412, an authorization to the first UE 402 to use the AD(s) 405 in response to the request received, at 410, from the first UE 402 to access the AD(s) 405. The transmission, at 1304, may be performed by the transmission component 1634 of the apparatus 1602 in FIG. 16.

At 1306, the AN may activate the one or more ADs to perform a second-stage BPL measurement between the first UE and the second UE via the one or more ADs and exchange beam training information over the SRB. For example, referring to FIG. 4, the AN 404 may transmit, at 414, one or more AD activation(s) to the AD(s) 405 for the first UE 402 and the second UE 403 to perform, at 416, a beam training procedure via the AD(s) 405. The activation, at 1306, may be performed by the activation component 1642 of the apparatus 1602 in FIG. 16.

Figure 14:
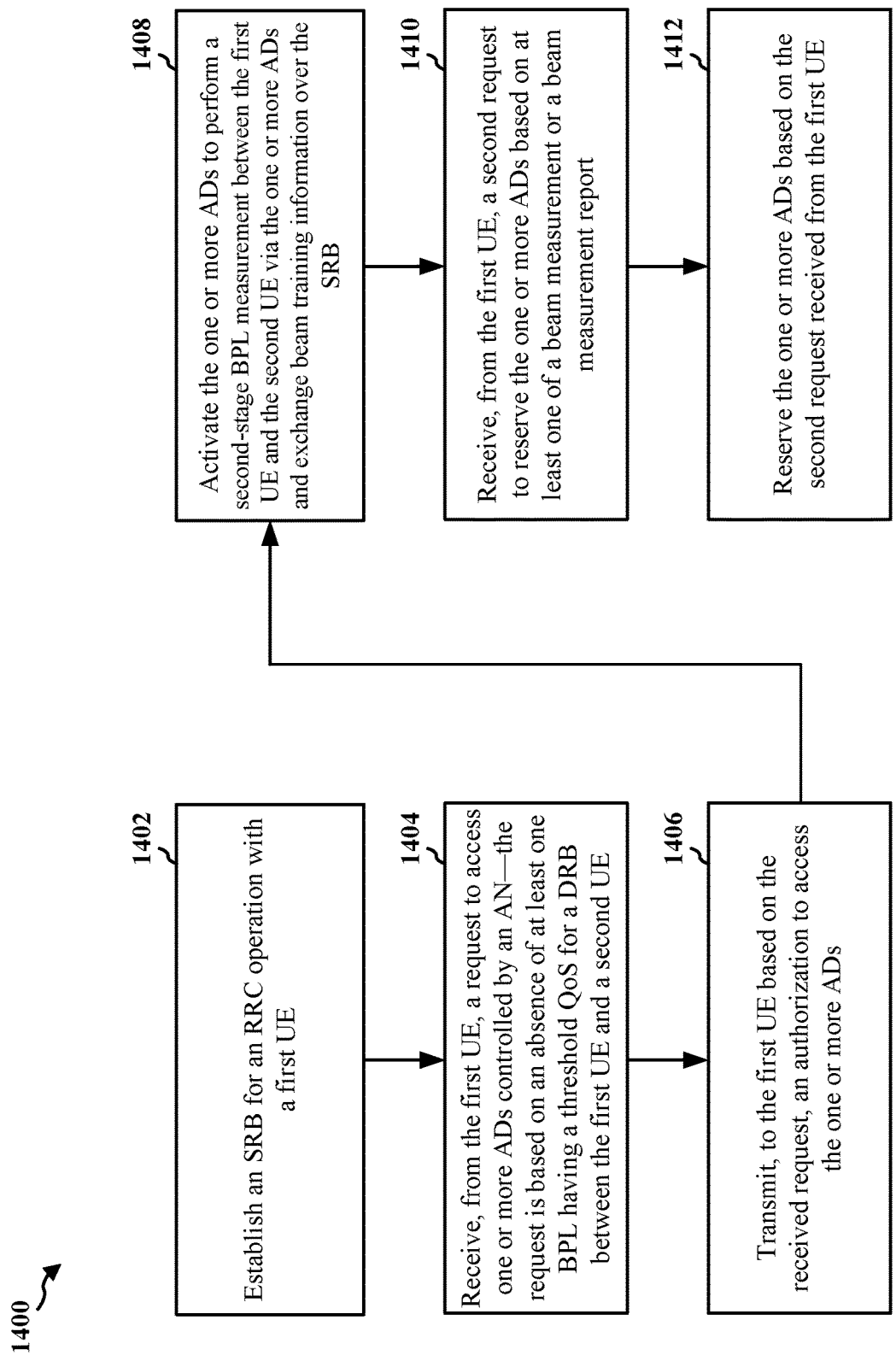
FIG. 14 is a flowchart of a method of wireless communication at an AN.

FIG. 14 is a flowchart 1400 of a method of wireless communication. The method may be performed by an AN (e.g., the AN 191, 404, 804; the apparatus 1602; etc.), which may include the memory 376 and which may be the entire AN 191, 404, 804 or a component of the AN 191, 404, 804, such as the TX processor 316, the RX processor 370, and/or the controller/processor 375.

At 1402, the AN may establish an SRB for an RRC operation with a first UE. For example, referring to FIG. 4, the AN 404 may establish, at 408, the SRB for the RRC message with the first UE 402. The establishing, at 1402, may be performed by the establishment component 1640 of the apparatus 1602 in FIG. 16.

At 1404, the AN may receive, from the first UE, a request to access one or more ADs controlled by an AN—the request is based on an absence of at least one BPL having a threshold QoS for a DRB between the first UE and a second UE. For example, referring to FIG. 4, the AN 404 may receive, at 410, a request from the first UE 402 to access the AD(s) 405. The request to access the AD(s) 405 received, at 410, may be based on a degraded communication link between the first UE 402 and the second UE 403. The request received, at 410, to access the one or more AD(s) 405 may include information indicative of at least one of a first location of the first UE 402 or a second location of the second UE 403. The at least one BPL having the threshold QoS for the DRB between the first UE 402 and the second UE 403 may be established, at 418, via the one or more AD(s) 405 based on the beam training information exchanged (e.g., at 416) between the first UE 402 and the second UE 403. The request to access the one or more AD(s) 405 may be received, at 410, from the first UE 402 based on a discovery procedure associated with the first UE 402. The reception, at 1404, may be performed by the reception component 1630 of the apparatus 1602 in FIG. 16.

At 1406, the AN may transmit, to the first UE based on the received request, an authorization to access the one or more ADs. For example, referring to FIG. 4, the AN 404 may transmit, at 412, an authorization to the first UE 402 to use the AD(s) 405 in response to the request received, at 410, from the first UE 402 to access the AD(s) 405. The authorization transmitted, at 412, to the first UE 402 to access the one or more AD(s) 405 may corresponds to at least one of one or more beam training periods, a configuration of the one or more AD(s) 405, a number of beams to be scanned by the first UE 402 and the second UE 403, or a total number of scans to be performed by the first UE 402 and the second UE 403. The one or more beam training periods may be aligned for a plurality of ANs that include the AN 404, or the one or more beam training periods may be unaligned for the plurality of ANs that include the AN 404. The transmission, at 1406, may be performed by the transmission component 1634 of the apparatus 1602 in FIG. 16.

At 1408, the AN may activate the one or more ADs to perform a second-stage BPL measurement between the first UE and the second UE via the one or more ADs and exchange beam training information over the SRB. For example, referring to FIG. 4, the AN 404 may transmit, at 414, one or more AD activation(s) to the AD(s) 405 for the first UE 402 and the second UE 403 to perform, at 416, a beam training procedure via the AD(s) 405. Beam training information exchanged (e.g., at 416) between the first UE 402 and the second UE 403 may correspond to at least one of a beam measurement or a beam measurement report. The beam measurement report may be indicative of at least one of a time that the beam measurement was performed or the at least one BPL having the threshold QoS for the DRB between the first UE 402 and the second UE 403. Beam training information (e.g., communicated at 416) may correspond to separate beam training periods for each AD included in the one or more AD(s) 405. The activation, at 1408, may be performed by the activation component 1642 of the apparatus 1602 in FIG. 16.

At 1410, the AN may receive, from the first UE, a second request to reserve the one or more ADs based on at least one of a beam measurement or a beam measurement report. For example, referring to FIG. 4, the AN 404 may receive, at 420, a request from the first UE 402 to reserve the AD(s) 405 for communication with second UE 403. The request received, at 420, to reserve the AD(s) 405 may be based on a beam measurement and/or a beam measurement report associated with the beam training procedure performed, at 416, between the first UE 402 and the second UE 403. The reception, at 1410, may be performed by the reception component 1630 of the apparatus 1602 in FIG. 16.

At 1412, the AN may reserve the one or more ADs based on the second request received from the first UE. For example, referring to FIG. 4, the AN 404 may transmit, at 422, one or more AD control(s) to the AD(s) 405 based on the request received, at 420, from the first UE 402 to reserve the AD(s) 405. The reservation, at 1412, may be performed by the reservation component 1644 of the apparatus 1602 in FIG. 16.

Figure 15:
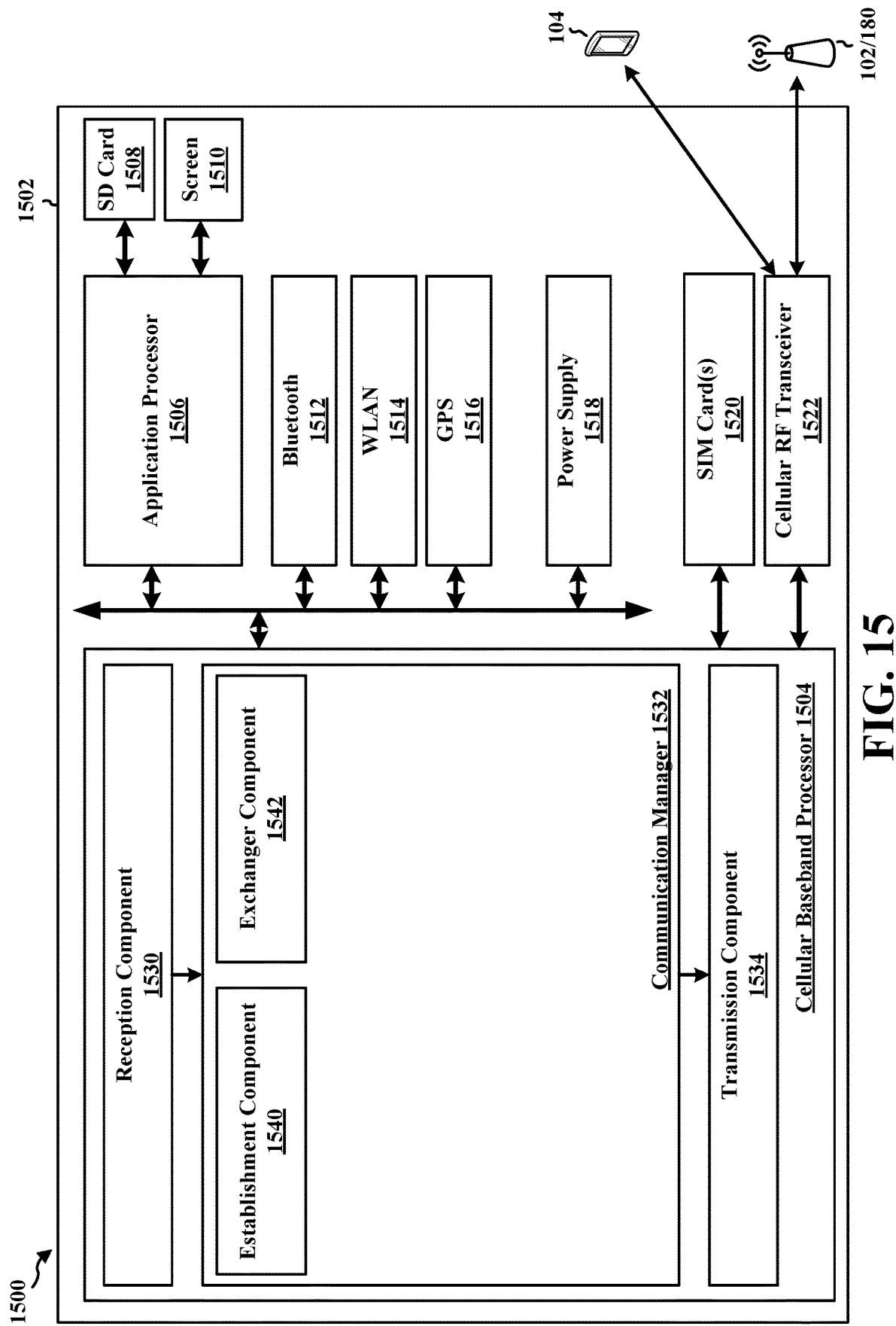
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The reception component 1530 is configured, e.g., as described in connection with 1104 and 1208, to receive, from the AN based on the transmitted request, an authorization to access the one or more ADs. The communication manager 1532 includes an establishment component 1540 that is configured, e.g., as described in connection with 1204 and 1212, to establish an SRB for an RRC operation with the AN; and to establish, via the one or more ADs, the at least one BPL having the threshold QoS for the DRB with the second UE based on the beam training information exchanged with the second UE. The communication manager 1532 further includes an exchanger component 1542 that is configured, e.g., as described in connection with 1106 and 1210, to exchange, via the SRB, beam training information with the second UE based on the authorization to access the one or more ADs for performing a beam training procedure via the one or more ADs. The transmission component 1534 is configured, e.g., as described in connection with 1102, 1202, 1206, and 1214, to transmit, to a second UE via an SRB over a same frequency range as a frequency range associated with a DRB or a different frequency range from the frequency range associated with the DRB, a message indicative of a request to access one or more ADs for exchanging beam training information with the second UE; to transmit, to an AN, a request to access the one or more ADs—the request is based on an absence of at least one BPL having a threshold QoS for a DRB with the second UE; and to transmit, to the AN, a second request to reserve the one or more ADs based on at least one of a beam measurement or a beam measurement report.

The apparatus may include additional components that perform each of the blocks of the algorithm in the flowcharts of FIGS. 11-12. As such, each block in the flowcharts of FIGS. 11-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for transmitting, to an AN, a request to access one or more ADs, the request is based on an absence of at least one BPL having a threshold QoS for a DRB with a second UE; means for receiving, from the AN based on the transmitted request, an authorization to access the one or more ADs; and means for exchanging, via the SRB, beam training information with the second UE based on the authorization to access the one or more ADs for performing a beam training procedure via the one or more ADs. The apparatus 1502 further includes means for transmitting, to the second UE via an SRB over a same frequency range as a frequency range associated with the DRB or a different frequency range from the frequency range associated with the DRB, a message indicative of the request to access the one or more ADs for exchanging the beam training information with the second UE. The apparatus 1502 further includes means for establishing, via the one or more ADs, the at least one BPL having the threshold QoS for the DRB with the second UE based on the beam training information exchanged with the second UE. The apparatus 1502 further includes means for transmitting, to the AN, a second request to reserve the one or more ADs based on the at least one of the beam measurement or the beam measurement report. The apparatus 1502 further includes means for establishing an SRB for an RRC operation with the AN.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
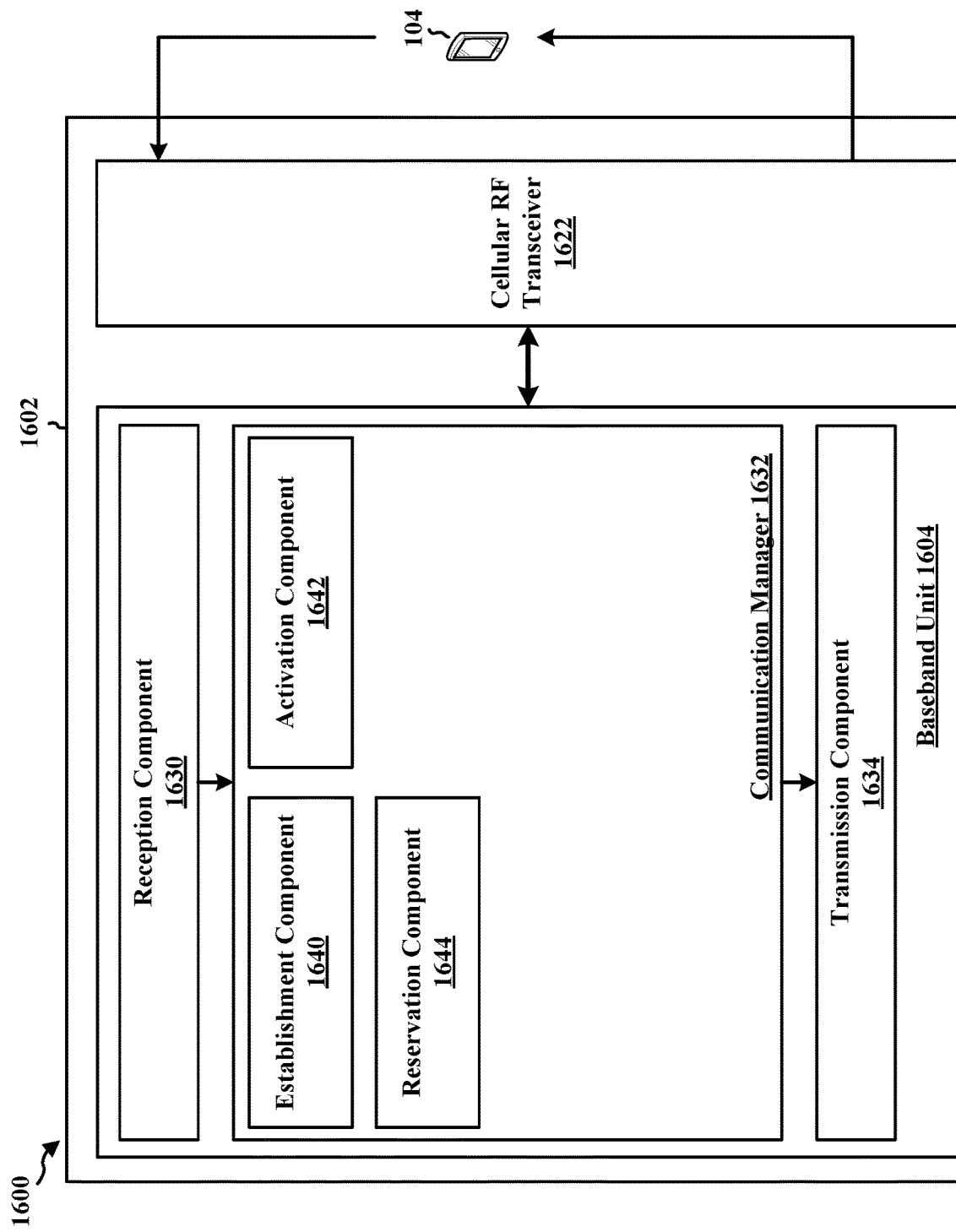
FIG. 16 is a diagram illustrating an example of a hardware implementation for an example apparatus.

FIG. 16 is a diagram 1600 illustrating an example of a hardware implementation for an apparatus 1602. The apparatus 1602 may be an AN, a component of an AN, or may implement AN functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the AN 310 and may include the memory 376 and/or at least one of the TX processor 316, the RX processor 370, and the controller/processor 375.

The reception component 1634 is configured, e.g., as described in connection with 1302, 1404, and 1410, to receive, from the first UE, a request to access one or more ADs controlled by an AN—the request is based on an absence of at least one BPL having a threshold QoS for a DRB between the first UE and a second UE; and to receive, from the first UE, a second request to reserve the one or more ADs based on at least one of a beam measurement or a beam measurement report. The communication manager 1632 includes an establishment component 1640 that is configured, e.g., as described in connection with 1402, to establish an SRB for an RRC operation with a first UE. The communication manager 1632 further includes an activation component 1642 that is configured, e.g., as described in connection with 1306 and 1408, to activate the one or more ADs to perform a second-stage BPL measurement between the first UE and the second UE via the one or more ADs and exchange beam training information over the SRB. The communication manager 1632 further includes a reservation component 1644 that is configured, e.g., as described in connection with 1412, to reserve the one or more ADs based on the second request received from the first UE. The transmission component 1634 is configured, e.g., as described in connection with 1304 and 1406, to transmit, to the first UE based on the received request, an authorization to access the one or more ADs.

The apparatus may include additional components that perform each of the blocks of the algorithm in the flowcharts of FIGS. 13-14. As such, each block in the flowcharts of FIGS. 13-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from a first UE, a request to access one or more ADs controlled by the AN, the request based on an absence of at least one BPL having a threshold QoS for a DRB between the first UE and a second UE; means for transmitting, to the first UE based on the received request, an authorization to access the one or more ADs; and means for activating the one or more ADs to perform a second-stage BPL measurement between the first UE and the second UE via the one or more ADs and exchange beam training information over the SRB. The apparatus 1602 further includes means for receiving, from the first UE, a second request to reserve the one or more ADs based on the at least one of the beam measurement or the beam measurement report. The apparatus 1602 further includes means for reserving the one or more ADs based on the second request received from the first UE. The apparatus 1602 further includes means for establishing an SRB for an RRC operation with the first UE.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to transmit, to an AN, a request to access one or more ADs, the request based on an absence of at least one BPL having a threshold QoS for a DRB with a second UE; receive, from the AN based on the transmitted request, an authorization to access the one or more ADs; and exchange, via the SRB, beam training information with the second UE based on the authorization to access the one or more ADs for performing a beam training procedure via the one or more ADs.

Aspect 2 may be combined with aspect 1 and includes that the at least one processor is further configured to transmit, to the second UE via an SRB over a same frequency range as a frequency range associated with the DRB or a different frequency range from the frequency range associated with the DRB, a message indicative of the request to access the one or more ADs for exchanging the beam training information with the second UE.

Aspect 3 may be combined with any of aspects 1-2 and includes that the request to access the one or more ADs includes information indicative of at least one of a first location of the first UE or a second location of the second UE.

Aspect 4 may be combined with any of aspects 1-3 and includes that the authorization to access the one or more ADs corresponds to at least one of one or more beam training periods, a configuration of the one or more ADs, a number of beams to be scanned by the first UE and the second UE, or a total number of scans to be performed by the first UE and the second UE.

Aspect 5 may be combined with any of aspects 1-4 and includes that the one or more beam training periods are aligned for a plurality of ANs including the AN.

Aspect 6 may be combined with any of aspects 1-4 and includes that the one or more beam training periods are unaligned for a plurality of ANs including the AN.

Aspect 7 may be combined with any of aspects 1-6 and includes that the at least one processor is further configured to establish, via the one or more ADs, the at least one BPL having the threshold QoS for the DRB with the second UE based on the beam training information exchanged with the second UE.

Aspect 8 may be combined with any of aspects 1-7 and includes that the beam training information exchanged with the second UE corresponds to at least one of a beam measurement or a beam measurement report.

Aspect 9 may be combined with any of aspects 1-8 and includes that the beam measurement report is indicative of at least one of a time that the beam measurement was performed or the at least one BPL having the threshold QoS for the DRB with the second UE.

Aspect 10 may be combined with any of aspects 1-9 and includes that the at least one processor is further configured to transmit, to the AN, a second request to reserve the one or more ADs based on the at least one of the beam measurement or the beam measurement report.

Aspect 11 may be combined with any of aspects 1-10 and includes that the request to access the one or more ADs is transmitted to the AN based on a discovery procedure associated with at least one of the AN or the one or more ADs.

Aspect 12 may be combined with any of aspects 1-11 and includes that the at least one processor is further configured to establish an SRB for an RRC operation with the AN.

Aspect 13 may be combined with any of aspects 1-12 and includes that the beam training information corresponds to separate beam training periods for each AD included in the one or more ADs.

Aspect 14 may be combined with any of aspects 1-13 and further includes at least one of an antenna or a transceiver coupled to the at least one processor.

Aspect 15 is an apparatus for wireless communication at an AN including at least one processor coupled to a memory and configured to receive, from a first UE, a request to access one or more ADs controlled by the AN, the request based on an absence of at least one BPL having a threshold QoS for a DRB between the first UE and a second UE; transmit, to the first UE based on the received request, an authorization to access the one or more ADs; and activate the one or more ADs to perform a second-stage BPL measurement between the first UE and the second UE via the one or more ADs and exchange beam training information over the SRB.

Aspect 16 may be combined with aspect 15 and includes that the request to access the one or more ADs includes information indicative of at least one of a first location of the first UE or a second location of the second UE.

Aspect 17 may be combined with any of aspects 15-16 and includes that the authorization to access the one or more ADs corresponds to at least one of one or more beam training periods, a configuration of the one or more ADs, a number of beams to be scanned by the first UE and the second UE, or a total number of scans to be performed by the first UE and the second UE.

Aspect 18 may be combined with any of aspects 15-17 and includes that the one or more beam training periods are aligned for a plurality of ANs including the AN.

Aspect 19 may be combined with any of aspects 15-17 and includes that the one or more beam training periods are unaligned for a plurality of ANs including the AN.

Aspect 20 may be combined with any of aspects 15-19 and includes that the at least one BPL having the threshold QoS for the DRB between the first UE and the second UE is established via the one or more ADs based on the beam training information exchanged between the first UE and the second UE.

Aspect 21 may be combined with any of aspects 15-20 and includes that the beam training information exchanged between the first UE and the second UE corresponds to at least one of a beam measurement or a beam measurement report.

Aspect 22 may be combined with any of aspects 15-21 and includes that the beam measurement report is indicative of at least one of a time that the beam measurement was performed or the at least one BPL having the threshold QoS for the DRB between the first UE and the second UE.

Aspect 23 may be combined with any of aspects 15-22 and includes that the at least one processor is further configured to receive, from the first UE, a second request to reserve the one or more ADs based on the at least one of the beam measurement or the beam measurement report.

Aspect 24 may be combined with any of aspects 15-23 and includes that the at least one processor is further configured to reserve the one or more ADs based on the second request received from the first UE.

Aspect 25 may be combined with any of aspects 15-24 and includes that the request to access the one or more ADs is received from the first UE based on a discovery procedure associated with the first UE.

Aspect 26 may be combined with any of aspects 15-25 and includes that the at least one processor is further configured to establish an SRB for an RRC operation with the first UE.

Aspect 27 may be combined with any of aspects 15-26 and includes that the beam training information corresponds to separate beam training periods for each AD included in the one or more ADs.

Aspect 28 may be combined with any of aspects 15-27 and further includes at least one of an antenna or a transceiver coupled to the at least one processor.

Aspect 29 is a method of wireless communication for implementing any of aspects 1-28.

Aspect 30 is an apparatus for wireless communication including means for implementing any of aspects 1-28.

Aspect 31 is a computer-readable medium storing computer executable code, the code when executed by at least one processor causes the at least one processor to implement any of aspects 1-28.

What is claimed is:

1. An apparatus for wireless communication at a first user equipment (UE), comprising:
   a memory; and
   at least one processor coupled to the memory and configured to:
      transmit, to an assisting node (AN), a request to access one or more assisting devices (ADs), the request based on an absence of at least one beam pair link (BPL) having a threshold quality of service (QoS) for a data radio bearer (DRB) with a second UE;
      receive, from the AN based on the transmitted request, an authorization to access the one or more ADs; and
      exchange, via a signaling radio bearer (SRB), beam training information with the second UE based on the authorization to access the one or more ADs for performing a beam training procedure via the one or more ADs.

2. The apparatus of claim 1, wherein the at least one processor is further configured to transmit, to the second UE via the SRB over a same frequency range as a frequency range associated with the DRB or a different frequency range from the frequency range associated with the DRB, a message indicative of the request to access the one or more ADs for exchanging the beam training information with the second UE.

3. The apparatus of claim 1, wherein the request to access the one or more ADs includes information indicative of at least one of a first location of the first UE or a second location of the second UE.

4. The apparatus of claim 1, wherein the authorization to access the one or more ADs corresponds to at least one of one or more beam training periods, a configuration of the one or more ADs, a number of beams to be scanned by the first UE and the second UE, or a total number of scans to be performed by the first UE and the second UE.

5. The apparatus of claim 4, wherein the one or more beam training periods are aligned for a plurality of ANs including the AN.

6. The apparatus of claim 4, wherein the one or more beam training periods are unaligned for a plurality of ANs including the AN.

7. The apparatus of claim 1, wherein the at least one processor is further configured to establish, via the one or more ADs, the at least one BPL having the threshold QoS for the DRB with the second UE based on the beam training information exchanged with the second UE.

8. The apparatus of claim 1, wherein the beam training information exchanged with the second UE corresponds to at least one of a beam measurement or a beam measurement report.

9. The apparatus of claim 8, wherein the beam measurement report is indicative of at least one of a time that the beam measurement was performed or the at least one BPL having the threshold QoS for the DRB with the second UE.

10. The apparatus of claim 8, wherein the at least one processor is further configured to transmit, to the AN, a second request to reserve the one or more ADs based on the at least one of the beam measurement or the beam measurement report.

11. The apparatus of claim 1, wherein the request to access the one or more ADs is transmitted to the AN based on a discovery procedure associated with at least one of the AN or the one or more ADs.

12. The apparatus of claim 1, wherein the at least one processor is further configured to establish the SRB for a radio resource control (RRC) operation with the AN.

13. The apparatus of claim 1, wherein the beam training information corresponds to separate beam training periods for each AD included in the one or more ADs.

14. The apparatus of claim 1, further comprising at least one of an antenna or a transceiver coupled to the at least one processor.

15. An apparatus for wireless communication at an assisting node (AN), comprising:
a memory; and
at least one processor coupled to the memory and configured to:
receive, from a first user equipment (UE), a request to access one or more assisting devices (ADs) controlled by the AN, the request based on an absence of at least one beam pair link (BPL) having a threshold quality of service (QoS) for a data radio bearer (DRB) between the first UE and a second UE;
transmit, to the first UE based on the received request, an authorization to access the one or more ADs; and
activate the one or more ADs to perform a second-stage BPL measurement between the first UE and the second UE via the one or more ADs and exchange beam training information over a signaling radio bearer (SRB).

16. The apparatus of claim 15, wherein the request to access the one or more ADs includes information indicative of at least one of a first location of the first UE or a second location of the second UE.

17. The apparatus of claim 15, wherein the authorization to access the one or more ADs corresponds to at least one of one or more beam training periods, a configuration of the one or more ADs, a number of beams to be scanned by the first UE and the second UE, or a total number of scans to be performed by the first UE and the second UE.

18. The apparatus of claim 17, wherein the one or more beam training periods are aligned for a plurality of ANs including the AN.

19. The apparatus of claim 17, wherein the one or more beam training periods are unaligned for a plurality of ANs including the AN.

20. The apparatus of claim 15, wherein the at least one BPL having the threshold QoS for the DRB between the first UE and the second UE is established via the one or more ADs based on the beam training information exchanged between the first UE and the second UE.

21. The apparatus of claim 15, wherein the beam training information exchanged between the first UE and the second UE corresponds to at least one of a beam measurement or a beam measurement report.

22. The apparatus of claim 21, wherein the beam measurement report is indicative of at least one of a time that the beam measurement was performed or the at least one BPL having the threshold QoS for the DRB between the first UE and the second UE.

23. The apparatus of claim 21, wherein the at least one processor is further configured to receive, from the first UE, a second request to reserve the one or more ADs based on the at least one of the beam measurement or the beam measurement report.

24. The apparatus of claim 23, wherein the at least one processor is further configured to reserve the one or more ADs based on the second request received from the first UE.

25. The apparatus of claim 15, wherein the request to access the one or more ADs is received from the first UE based on a discovery procedure associated with the first UE.

26. The apparatus of claim 15, wherein the at least one processor is further configured to establish a signaling radio bearer (SRB) the SRB for a radio resource control (RRC) operation with the first UE.

27. The apparatus of claim 15, wherein the beam training information corresponds to separate beam training periods for each AD included in the one or more ADs.

28. The apparatus of claim 15, further comprising at least one of an antenna or a transceiver coupled to the at least one processor.

29. A method of wireless communication at a first user equipment (UE), comprising:
transmitting, to an assisting node (AN), a request to access one or more assisting devices (ADs), the request based on an absence of at least one beam pair link (BPL) having a threshold quality of service (QoS) for a data radio bearer (DRB) with a second UE;

receiving, from the AN based on the transmitted request, an authorization to access the one or more ADs; and exchanging, via a signaling radio bearer (SRB), beam training information with the second UE based on the authorization to access the one or more ADs for performing a beam training procedure via the one or more ADs.

30. A method of wireless communication at an assisting node (AN), comprising:

receiving, from a first user equipment (UE), a request to access one or more assisting devices (ADs) controlled by the AN, the request based on an absence of at least one beam pair link (BPL) having a threshold quality of service (QoS) for a data radio bearer (DRB) between the first UE and a second UE;

transmitting, to the first UE based on the received request, an authorization to access the one or more ADs; and activating the one or more ADs to perform a second-stage BPL measurement between the first UE and the second UE via the one or more ADs and exchange beam training information over a signaling radio bearer (SRB).

* * * * *